(12) United States Patent
Okano et al.

(10) Patent No.: US 12,071,128 B2
(45) Date of Patent: Aug. 27, 2024

(54) VEHICLE DRIVE ASSIST APPARATUS

(71) Applicant: SUBARU CORPORATION, Tokyo (JP)

(72) Inventors: Masashi Okano, Tokyo (JP); Kazuki Takahashi, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 231 days.

(21) Appl. No.: 17/866,893

(22) Filed: Jul. 18, 2022

(65) Prior Publication Data

US 2023/0029842 A1 Feb. 2, 2023

(30) Foreign Application Priority Data

Jul. 28, 2021 (JP) .................. 2021-123448

(51) Int. Cl.
*B60W 30/12* (2020.01)
*B60W 40/04* (2006.01)
(52) U.S. Cl.
CPC ............ *B60W 30/12* (2013.01); *B60W 40/04* (2013.01); *B60W 2420/403* (2013.01); *B60W 2540/18* (2013.01); *B60W 2554/4045* (2020.02); *B60W 2554/801* (2020.02)
(58) Field of Classification Search
CPC .................. B60W 30/12; B60W 40/04; B60W 2554/4045; B60W 2554/801; B60W 2420/403; B60W 2540/18; B60W 2552/50; B60W 2552/53; B60W 2554/4041; B60W 2754/20; B60W 2554/805
See application file for complete search history.

(56) References Cited

U.S. PATENT DOCUMENTS

2019/0270447 A1\* 9/2019 Tsuchiya ................ G08G 1/165
2020/0148205 A1  5/2020 Yoshida et al.
2020/0385021 A1\* 12/2020 Eguchi .................. B60W 30/12

FOREIGN PATENT DOCUMENTS

JP    2013-043563 A    3/2013
JP    2020-158090 A    10/2020
WO   2019/043847 A1    7/2019

\* cited by examiner

*Primary Examiner* — Tyler J Lee
*Assistant Examiner* — Yufeng Zhang
(74) *Attorney, Agent, or Firm* — Rimon P.C.

(57) ABSTRACT

A surrounding situation information acquisition device acquires surrounding situation information of a vehicle. A steering angle sensor detects a steering angle and a steering direction of the vehicle. A steering assist controller executes traveling control involving steering assist control based on information output from the surrounding situation information acquisition device and information output from the steering angle sensor. The steering assist controller recognizes, based on the information output from the surrounding situation information acquisition device, an oncoming vehicle in an oncoming lane adjacent to a traveling lane of the vehicle and an avoidance target on a road shoulder side of the traveling lane of the vehicle, estimates an avoidance priority level of the oncoming vehicle and an avoidance priority level of the avoidance target, and sets a new target lane keeping traveling path of the vehicle based on the avoidance priority levels.

7 Claims, 8 Drawing Sheets

VEHICLE DRIVE ASSIST APPARATUS

CROSS-REFERENCE TO RELATED APPLICATIONS

The present application claims priority from Japanese Patent Application No. 2021-123448 filed on Jul. 28, 2021, the entire contents of which are hereby incorporated by reference.

BACKGROUND

The disclosure relates to a vehicle drive assist apparatus that assists a driving operation of a driver by lane keeping traveling control and lane departure prevention control.

In the field of vehicles such as automobiles, autonomous driving control technologies have been developed to cause the vehicles to autonomously travel without driving operations of drivers. Various drive assist apparatuses using the autonomous driving control technologies have been proposed and put into practical use to perform various types of control for assisting driving operations of drivers.

Examples of related-art drive assist apparatuses include a drive assist apparatus having an active lane keeping (ALK) traveling control function. In this drive assist apparatus, the vehicle continues to travel along a traveling lane based on various types of acquired information data while constantly recognizing situations around the vehicle by using various sensor devices and other devices.

Examples of the related-art drive assist apparatuses also include a drive assist apparatus having a lane departure prevention (LDP) control function. This drive assist apparatus performs predetermined steering assist control as appropriate when determination is made that the vehicle is likely to depart from the traveling lane, thereby avoiding or suppressing the departure of the vehicle from the traveling lane.

Various obstacles are present in ordinary vehicular roads having no median strip at the center as a three-dimensional structure. Examples of the obstacles include three-dimensional structures typified by curbstones, guardrails, side walls (including a snow wall on a snowy road), and utility poles at a boundary between a roadway and a sidewalk, other vehicles parked or stopped in side areas of the road (road shoulders), other vehicles stopped in a right or left area of a traveling lane of the vehicle behind an intersection to turn right or left, and road cones for lane closure under roadwork or for bordering with the construction area.

The obstacles described above are referred to collectively as "avoidance targets". The avoidance target may hinder the traveling of the vehicle, and therefore collision between the vehicle and the avoidance target is avoided. In the ordinary roads described above, the area where the vehicle can travel is limited by the avoidance targets.

In order that the vehicle including the related-art drive assist apparatus can continue to travel along the road safely while performing the lane keeping traveling control and the lane departure prevention control, the area where the vehicle can travel is constantly grasped by recognizing situations around the vehicle (for example, situations including obstacles on the road).

When controlling the traveling of the vehicle in the ordinary road having no three-dimensional structure such as a median strip, the vehicle drive assist apparatus recognizes a surrounding situation including other vehicles traveling, parked, or stopped in an oncoming lane (hereinafter referred to collectively as "vehicles in oncoming lane").

For example, International Publication (WO) No. 2019/043847, Japanese Unexamined Patent Application Publication (JP-A) No. 2020-158090, and Japanese Unexamined Patent Application Publication (JP-A) No. 2013-043563 disclose various related-art technologies for drive assist apparatuses to recognize the surrounding situation around the vehicle traveling along a road and control the traveling of the vehicle as appropriate depending on the recognized surrounding situation.

A drive assist apparatus disclosed in WO 2019/043847 recognizes another vehicle traveling beside the vehicle, and sets a traveling path of the vehicle by adjusting as appropriate a lateral distance in a width direction between the vehicle and the other vehicle based on a relative positional relationship between the vehicle and the other vehicle and the type of the other vehicle.

A drive assist apparatus disclosed in JP-A No. 2020-158090 recognizes lane lines and another vehicle traveling beside the vehicle, and sets a traveling path of the vehicle by adjusting as appropriate a lateral distance in a width direction between the vehicle and the other vehicle based on the lane lines and a relative positional relationship between the vehicle and the other vehicle.

A drive assist apparatus disclosed in JP-A No. 2013-043563 recognizes a surrounding situation, estimates risk levels of collision with various recognized targets, and sets a traveling path of the vehicle by adjusting as appropriate lateral distances in a width direction between the vehicle and the surrounding targets based on the estimated collision risk levels.

SUMMARY

An aspect of the disclosure provides a vehicle drive assist apparatus to be applied to a vehicle. The vehicle drive assist apparatus is configured to execute at least lane keeping traveling control for causing the vehicle to travel along a traveling lane and lane departure prevention control for suppressing departure of the vehicle from the traveling lane. The vehicle drive assist apparatus includes a surrounding situation information acquisition device, a steering angle sensor, and a traveling controller. The surrounding situation information acquisition device is configured to acquire surrounding situation information of the vehicle. The steering angle sensor is configured to detect a steering angle and a steering direction of the vehicle. The traveling controller is configured to centrally control an entire of the vehicle. The traveling controller includes a steering assist controller configured to execute traveling control involving steering assist control based on information output from the surrounding situation information acquisition device and information output from the steering angle sensor. The steering assist controller is configured to recognize, based on the information output from the surrounding situation information acquisition device, an oncoming vehicle in an oncoming lane adjacent to the traveling lane of the vehicle and an avoidance target on a road shoulder side of the traveling lane of the vehicle, estimate an avoidance priority level of the oncoming vehicle and an avoidance priority level of the avoidance target, and set a new target lane keeping traveling path of the vehicle based on the avoidance priority level of the oncoming vehicle and the avoidance priority level of the avoidance target.

An aspect of the disclosure provides a vehicle drive assist apparatus to be applied to a vehicle. The vehicle drive assist apparatus is configured to execute at least lane keeping traveling control for causing the vehicle to travel along a traveling lane and lane departure prevention control for suppressing departure of the vehicle from the traveling lane. The vehicle drive assist apparatus includes a surrounding situation information acquisition device, a steering angle sensor, and circuitry. The surrounding situation information acquisition device is configured to acquire surrounding situation information of the vehicle. The steering angle sensor is configured to detect a steering angle and a steering direction of the vehicle. The circuitry is configured to centrally control an entire of the vehicle. The circuitry is configured to execute traveling control involving steering assist control based on information output from the surrounding situation information acquisition device and information output from the steering angle sensor. The circuitry is configured to recognize, based on the information output from the surrounding situation information acquisition device, an oncoming vehicle in an oncoming lane adjacent to the traveling lane of the vehicle and an avoidance target on a road shoulder side of the traveling lane of the vehicle. The circuitry is configured to estimate an avoidance priority level of the oncoming vehicle and an avoidance priority level of the avoidance target. The circuitry is configured to set a new target lane keeping traveling path of the vehicle based on the avoidance priority level of the oncoming vehicle and the avoidance priority level of the avoidance target.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

Figure 1:
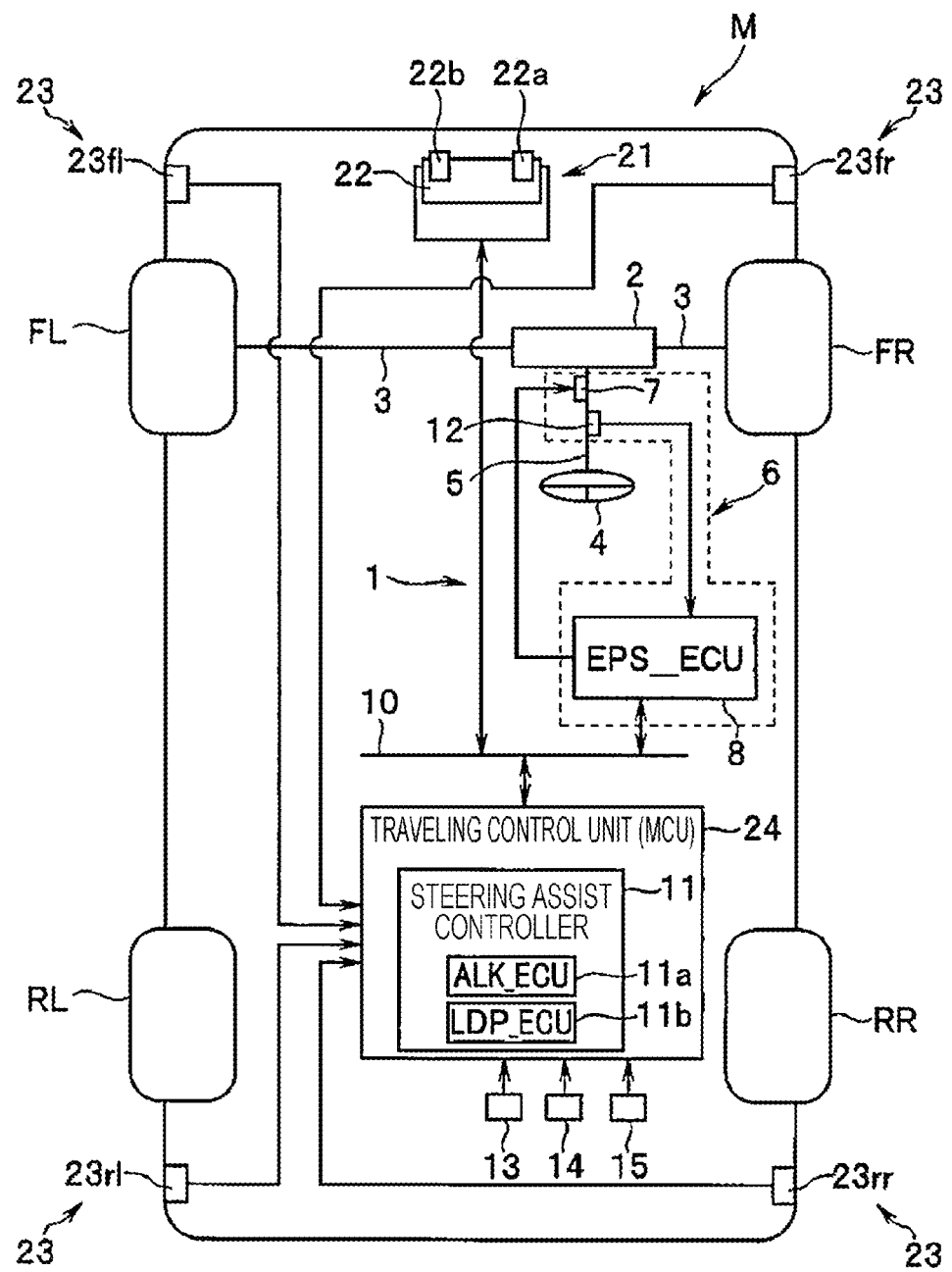
FIG. 1 is a block diagram illustrating a schematic configuration of a vehicle including a drive assist apparatus according to an embodiment of the disclosure.

In a case where a vehicle is traveling along, for example, an ordinary road having no three-dimensional structure such as a median strip and another vehicle is present in an oncoming lane (hereinafter referred to as "oncoming vehicle"), the driver may feel pressure from the oncoming vehicle along with a decrease in a lateral distance between the vehicle and the oncoming vehicle. In this situation, the driver may steer the vehicle away from the oncoming vehicle in the lateral direction.

In this case, the direction in which the vehicle moves away from the oncoming vehicle is a direction opposite to the direction to the oncoming lane, that is, a direction to a road shoulder. For example, in a case of left-hand traffic, the direction opposite to the direction to the oncoming lane corresponds to a direction to a left area of the road. An avoidance target may be present in the direction to this area (the direction opposite to the direction to the oncoming lane; the direction to the road shoulder).

When the driver steers the traveling vehicle to avoid collision with the oncoming vehicle, that is, opposite to the oncoming lane (toward the road shoulder) while being aware of the oncoming vehicle, the vehicle moves in the direction opposite to the direction to the oncoming lane (the direction to the road shoulder). Then, the vehicle drive assist apparatus may activate either one of lane keeping control and lane departure prevention control against the avoidance target on the road shoulder side.

In this situation, the driver steers the vehicle as a driving operation for avoiding the collision with the oncoming vehicle under the pressure from the oncoming vehicle. Therefore, the driver recognizes the steering as an appropriate driving operation.

The lane departure prevention control that may be activated in response to the steering causes a change from the steering intended by the driver (steering opposite to the oncoming lane (toward the road shoulder)) to steering toward the oncoming lane. This lane departure prevention control is unintended behavior for the driver, and therefore the driver may feel discomfort.

In the case where the vehicle is traveling along the ordinary road having no three-dimensional structure such as a median strip, the surrounding situation including obstacles on the road shoulder side may be, for example, a situation in which a tall side wall extends along the road. In this situation, the driver may feel pressure from the tall side wall. In this case, the driver may recognize the side wall as the avoidance target and steer the vehicle away from the tall side wall in the lateral direction.

In this case, an oncoming lane is present in an area opposite to the tall side wall (avoidance target), and an oncoming vehicle may be traveling in the oncoming lane as an avoidance target. In this case, the vehicle drive assist apparatus may recognize the avoidance target and activate either one of the lane keeping control and the lane departure prevention control. Due to either one of the lane keeping control and the lane departure prevention control, the driver may feel discomfort.

The related-art drive assist apparatuses disclosed in WO 2019/043847, JP-A No. 2020-158090, and JP-A No. 2013-043563 perform the control for setting a traveling path in consideration of either one of another vehicle traveling beside the vehicle and an obstacle having a possibility of collision. For example, there is room for improvement toward traveling control in the case where the vehicle is steered out of the set traveling path with the driver's intention.

It is desirable to provide a vehicle drive assist apparatus that can perform more appropriate drive assist control without causing driver's discomfort.

An embodiment of the disclosure is described below. The drawings for use in the following description are schematic drawings. To illustrate constituent elements in recognizable sizes in the drawings, dimensional relationships and scales of members may be varied among the constituent elements. The embodiment of the disclosure is not limited to the embodiment in the drawings in terms of the numbers, shapes, size ratios, and relative positional relationships of the constituent elements in the drawings.

A drive assist apparatus according to the embodiment of the disclosure is mounted on a vehicle such as an automobile, and executes drive assist control for assisting a driving operation of a driver of the vehicle. For example, the drive assist apparatus of this embodiment acquires information related to a surrounding situation around the vehicle by using various sensor devices such as an image sensor of a camera unit and a radar sensor of a radar device. The various sensor devices are autonomous sensor devices that operate autonomously.

The information related to the surrounding situation around the vehicle is information related to avoidance targets such as moving objects typified by pedestrians, bicycles, and other vehicles including two-wheel vehicles, such as a preceding vehicle, a succeeding vehicle, and an oncoming vehicle traveling around the vehicle and another vehicle traveling beside the vehicle, stationary objects typified by various three-dimensional structures including curbstones, guardrails, side walls, and utility poles and other vehicles parked or stopped in road side areas (road shoulders), and various objects around the traveling vehicle. The information related to the surrounding situation around the vehicle is hereinafter referred to as "surrounding situation information". As described above, the surrounding situation information is acquired by using the various sensor devices.

The drive assist apparatus of this embodiment uses the acquired surrounding situation information as appropriate in the drive assist control for assisting the driving operation of the driver of the vehicle.

Examples of the drive assist control to be executed by the drive assist apparatus of this embodiment include active lane keeping (ALK) traveling control and lane departure prevention (LDP) control.

Figure 2:
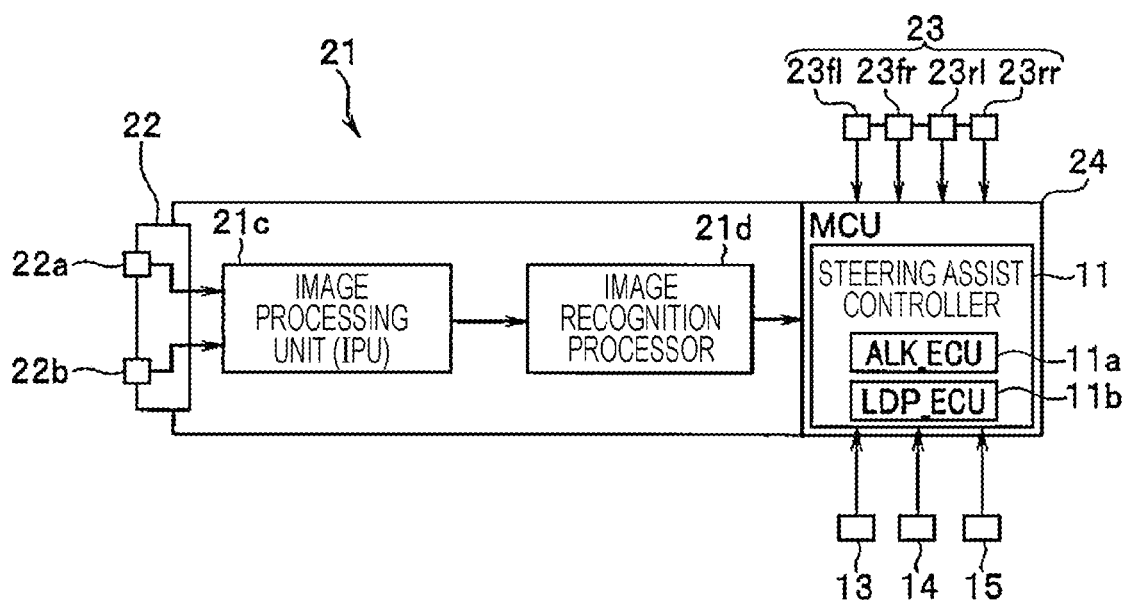
FIG. 2 is a block diagram illustrating a schematic configuration around a camera unit and a traveling control unit (MCU) of the drive assist apparatus according to the embodiment of the disclosure.

The schematic configuration of the drive assist apparatus according to the embodiment of the disclosure is described with reference to FIG. 1 and FIG. 2. FIG. 1 is a block diagram illustrating the schematic configuration of the vehicle including the drive assist apparatus according to the embodiment of the disclosure. FIG. 2 is a block diagram illustrating a schematic configuration around a camera unit and a traveling control unit (MCU) of the drive assist apparatus according to the embodiment of the disclosure.

A drive assist apparatus 1 of this embodiment is mounted on a vehicle M such as an automobile. The drive assist apparatus 1 basically has a configuration substantially similar to those of related-art drive assist apparatuses of the same type. FIG. 1 and FIG. 2 illustrate constituent elements related directly to the embodiment of the disclosure among the constituent elements of the drive assist apparatus 1 of this embodiment, and illustration is omitted for constituent elements that are not related directly to the embodiment of the disclosure. The constituent elements other than the constituent elements related directly to the embodiment of the disclosure are not described in detail below under the assumption that the constituent elements are substantially similar to those of the related-art drive assist apparatuses, and the constituent elements related directly to the embodiment of the disclosure are described in detail below.

As illustrated in FIG. 1, the drive assist apparatus 1 of this embodiment includes a camera unit 21, a radar device 23, a traveling control unit 24 including a steering assist controller 11, and an electric power steering (EPS) device 6 (hereinafter referred to as "EPS device 6"). In one embodiment, the camera unit 21 and the radar device 23 may serve as a "surrounding situation information acquisition device". In one embodiment, the traveling control unit 24 may serve as a "traveling controller".

As illustrated in FIG. 1 and FIG. 2, the camera unit 21 includes an on-board camera 22, an image processing unit (IPU) 21c (not illustrated in FIG. 1; hereinafter referred to as "IPU 21c"), and an image recognition processor 21d (not illustrated in FIG. 1). The on-board camera 22 is a stereo camera including a main camera 22a and a subcamera 22b, and is a surrounding situation acquisition sensor and an autonomous sensor device. The IPU 21c is coupled to the on-board camera 22 (22a, 22b). The IPU 21c is coupled to the image recognition processor 21d.

For example, the on-board camera 22 is disposed on an upper front part of a rearview mirror at the front of a cabin of the vehicle M, that is, at a position close to the inner surface of a windshield of the vehicle M. In this case, the two cameras (22a, 22b) of the on-board camera 22 are arranged in a horizontal direction with substantially equal distances to right and left from the center in a width direction of the vehicle M.

For example, the on-board camera 22 is the autonomous sensor device that senses a real space ahead of the vehicle M to acquire image information on a surrounding situation ahead of the vehicle M. The main camera 22a and the subcamera 22b of the on-board camera 22 are bilaterally symmetrical across the center in the vehicle width direction. The on-board camera 22 acquires data on two images captured by the two cameras (22a, 22b) from different viewpoints in an area within a predetermined range ahead of the vehicle M.

The IPU 21c is a circuit unit that performs predetermined image processing based on the data on the two images acquired by the on-board camera 22 (22a, 22b). For example, the IPU 21c generates stereoscopic image information (three-dimensional image information) based on the data on the two images acquired by the on-board camera 22 (22a, 22b), and generates image information including distance information (hereinafter referred to as "distance image information") obtained from positional deviation amounts on the same target in the two images. The generated distance image information is transmitted to the image recognition processor 21d.

The image recognition processor 21d functions as a surrounding situation recognition processor that receives the distance image information from the IPU 21c and recognizes a surrounding situation around the vehicle M based on the distance image information.

For example, the image recognition processor 21d recognizes right and left lane lines of a traveling lane of a road where the vehicle M is traveling, and obtains various types of information such as a road curvature [1/m] between the right and left lane lines and a width between the right and left lane lines (lane width).

The image recognition processor 21d performs predetermined pattern matching based on the distance image information to recognize various three-dimensional objects (avoidance targets) such as curbstones, guardrails, side walls, and utility poles along the road, and pedestrians, bicycles, and other vehicles including two-wheel vehicles on the road where the vehicle M is traveling. The recognition of the target by the image recognition processor 21d includes acquisition of various types of information such as a type of the target, a distance to the target, a moving speed of the target, and a relative speed between the target and the vehicle M.

The camera unit 21 of the drive assist apparatus 1 of this embodiment acquires surrounding situation information by recognizing a surrounding situation around the vehicle M based on image data of the surrounding situation acquired by the on-board camera 22 that is the autonomous sensor device serving as the surrounding situation acquisition sensor. In one embodiment, the camera unit 21 may serve as a "surrounding situation information acquisition device".

The traveling control unit 24 is a processor including hardware constituted by a known microcontroller unit (MCU) and peripheral devices around the MCU. For example, the MCU includes a central processing unit (CPU), a random access memory (RAM), a read only memory (ROM), a non-volatile memory, a non-volatile storage, and a non-transitory computer readable medium. The ROM, the non-volatile memory, and the non-volatile storage prestore software programs to be executed by the MCU and fixed data such as data tables. The MCU reads the software programs stored in the ROM and the like and executes the software programs by loading the software programs in the RAM. The software programs implement predetermined functions of the units in the drive assist apparatus 1 of this embodiment by referring to various types of data as appropriate.

The processor may be implemented by a semiconductor chip such as a field programmable gate array (FPGA). The software programs may entirely or partly be recorded as computer program products in a non-transitory computer readable medium such as a portable sheet medium typified by a flexible disk, a CD-ROM, or a DVD-ROM, a card memory, a hard disk drive (HDD), or a solid state drive (SSD).

Various units including various sensor devices such as the camera unit 21 and the radar device 23 are coupled to the traveling control unit (MCU) 24. The traveling control unit 24 controls operation statuses of the various coupled units, performs predetermined traveling control as appropriate by receiving detection results from the various sensor devices (surrounding situation information), and centrally controls the entire drive assist apparatus 1 of this embodiment.

Examples of the various sensor devices for recognizing the surrounding situation around the vehicle M include the on-board camera 22 in the camera unit 21, radar sensors (23fl, 23fr, 23rl, 23rr) in the radar device 23, a vehicle speed sensor 13 that detects a current vehicle speed of the vehicle M by detecting rotation speeds of right and left wheels at the front and rear of the vehicle M, either one of a lateral acceleration sensor and a yaw rate sensor 14 that detects a yaw rate and a lateral acceleration of the vehicle M, a steering angle sensor 15 that detects a steering angle of the vehicle M, a gyro sensor (not illustrated) that detects either one of an angular velocity and an angular acceleration of the vehicle M, and a global navigation satellite system (GNSS) receiver (not illustrated) that receives positioning signals from a plurality of positioning satellites.

As illustrated in FIG. 2, the drive assist apparatus 1 of this embodiment includes the radar device 23 that may serve as the surrounding situation information acquisition device. The radar device 23 is coupled to the traveling control unit 24. The radar device 23 acquires data related to the surrounding situation, performs a predetermined process, and outputs, to the traveling control unit 24, recognition data in a predetermined format including the surrounding situation information.

The radar device 23 includes a plurality of radar sensors. The radar device 23 of this embodiment includes four radar sensors in the vehicle M. Examples of the plurality of (four) radar sensors include a right front side radar sensor 23fr, a left front side radar sensor 23fl, a right rear side radar sensor 23rr, and a left rear side radar sensor 23rl.

Among the four radar sensors (23fl, 23fr, 23rl, 23rr) of the radar device 23, the right front side radar sensor 23fr and the left front side radar sensor 23fl are provided, for example, on right and left sides of a front bumper of the vehicle M. The right front side radar sensor 23fr and the left front side radar sensor 23fl recognize objects in right and left obliquely forward and side areas around the vehicle M. Those areas cannot be recognized from data on two images acquired by the on-board camera 22 (22a, 22b). The areas recognized by the right front side radar sensor 23fr and the left front side radar sensor 23fl partly overlap the areas recognized by the on-board camera 22 (22a, 22b). Thus, the on-board camera 22 (22a, 22b), the right front side radar sensor 23fr, and the left front side radar sensor 23fl may recognize the substantially entire areas from the right and left front sides to the front of the vehicle M.

Among the four radar sensors (23fl, 23fr, 23rl, 23rr) of the radar device 23, the right rear side radar sensor 23rr and the left rear side radar sensor 23rl are provided, for example, on right and left sides of a rear bumper of the vehicle M. The right rear side radar sensor 23rr and the left rear side radar sensor 23rl recognize objects in areas from right and left rear sides to the rear of the vehicle M. Those areas cannot be recognized by the right front side radar sensor 23fr and the left front side radar sensor 23fl. The areas recognized by the right rear side radar sensor 23rr and the left rear side radar sensor 23rl partly overlap each other. Thus, the right rear side radar sensor 23rr and the left rear side radar sensor 23rl may recognize the substantially entire areas from the right and left rear sides to the rear of the vehicle M.

The radar device 23 acquires surrounding situation information of the vehicle M by recognizing, for example, positions, relative speeds, and sizes of three-dimensional objects at the front, rear, and right and left sides of the vehicle M. In one embodiment, the radar device 23 may serve as a "surrounding situation information acquisition device".

The information related to the three-dimensional objects recognized by the radar device 23 is input to the traveling control unit 24. In response to the information, the traveling control unit 24 recognizes, as the three-dimensional objects, other vehicles around the vehicle M, such as a preceding vehicle, a vehicle traveling beside the vehicle M on the right or left side, a succeeding vehicle, and a vehicle approaching the vehicle M at an intersection from a road intersecting the traveling road of the vehicle M, and various moving objects such as a pedestrian and a bicycle around the vehicle M.

Examples of the radar device 23 include a millimeter wave radar device, a laser radar device, and a light detection and ranging (LiDAR) device.

The traveling control unit 24 includes the steering assist controller 11. For example, the steering assist controller 11 is implemented by an electronic circuit in the traveling control unit 24.

The steering assist controller 11 may be implemented by a processor including hardware independent of the traveling control unit 24 instead of being provided in the traveling control unit 24.

The steering assist controller 11 of the drive assist apparatus 1 of this embodiment performs traveling control involving steering assist control, such as lane keeping traveling control and lane departure prevention control, among various types of control to be executed by the drive assist apparatus 1 of this embodiment. For example, the steering assist controller 11 includes a lane keeping traveling control unit (hereinafter referred to as "ALK_ECU") 11a and a lane departure prevention control unit (hereinafter referred to as "LDP_ECU") 11b.

The ALK_ECU 11a contributes to steering assist control for causing the vehicle M to travel stably in a traveling lane (lane keeping control). The lane keeping traveling control is the following traveling control including steering control. Right and left lane lines of the traveling lane of the vehicle M and surrounding three-dimensional structures (avoidance targets such as curbstones, guardrails, side walls, and utility poles) are recognized based on a surrounding situation ahead and on the sides of the vehicle M that is recognized by the surrounding situation acquisition sensors such as the on-board camera 22 of the camera unit 21 and the radar sensors (23fl, 23fr, 23rl, 23rr) of the radar device 23. Then, the vehicle M is caused to travel along the center between the right and left lane lines by the steering control.

The LDP_ECU 11b contributes to steering assist control for assisting the driver's steering when avoiding danger encountered while the vehicle M is traveling along a traveling lane, for example, either one of collision and contact between the vehicle M and an obstacle on a traveling road (lane departure prevention control). The lane departure prevention control is the following traveling control. A surrounding situation including right and left lane lines of the traveling lane of the vehicle M and surrounding three-dimensional structures (avoidance targets such as curbstones, guardrails, side walls, and utility poles) is recognized based on a surrounding situation ahead and on the sides of the vehicle M that is recognized by the surrounding situation acquisition sensors such as the on-board camera 22 of the camera unit 21 and the radar sensors (23fl, 23fr, 23rl, 23rr) of the radar device 23. When determination is made that the traveling direction of the vehicle M is likely to depart from the traveling lane, predetermined steering control is performed to control a steering torque so that the vehicle M travels parallel to the right and left lane lines, thereby avoiding or suppressing the departure of the vehicle M from the traveling lane.

The configurations of the ALK_ECU 11a and the LDP_ECU 11b applied to the drive assist apparatus 1 of this embodiment are substantially similar to those applied to the related-art drive assist apparatuses of the same type. Therefore, further details of the configurations of those control units are omitted.

The EPS device 6 is a unit for performing predetermined steering assist control at a predetermined timing as appropriate.

As illustrated in FIG. 1, the vehicle M includes right and left front wheels FR and FL and right and left rear wheels RR and RL. The right and left front wheels FR and FL are coupled to a steering mechanism 2 including a rack and pinion mechanism via tie rods 3. A steering shaft 5 with a steering wheel 4 fixed at its distal end is coupled to the steering mechanism 2. When the driver operates the steering wheel 4, the right and left front wheels FR and FL are turned via the steering shaft 5 and the steering mechanism 2. The steering mechanism 2, the tie rods 3, the steering wheel 4, and the steering shaft 5 constitute a steering mechanism of the vehicle M. This steering mechanism has a configuration substantially similar to those of related-art steering mechanisms generally mounted on vehicles such as automobiles.

The EPS device 6 acts on the steering shaft 5 of the steering mechanism. The EPS device 6 includes an EPS motor 7, an EPS control unit (EPS_ECU) 8, and a steering torque sensor 12.

Although illustration is omitted, the vehicle M includes, in addition to the EPS_ECU 8, the traveling control unit 24, and the camera unit 21, various control units that control traveling conditions of the vehicle, such as a transmission control unit, a brake control unit, and a drive source control unit that controls a drive source such as an engine or an electric motor. The various control units are coupled in a bidirectionally communicable manner via an internal network using a controller area network (CAN) communication 10.

The EPS motor 7 of the EPS device 6 is coupled to the steering shaft 5 via a transmission mechanism (not illustrated). The EPS_ECU 8 controls a steering torque to be applied to the steering shaft 5 by the EPS motor 7.

The steering torque sensor 12 is a sensor device that detects a steering torque applied to the steering wheel 4 as a driving operation amount of the driver. The steering torque sensor 12 is attached to the steering shaft 5. The steering torque sensor 12 is coupled to the EPS_ECU 8. A detection result from the steering torque sensor 12 is output to the EPS_ECU 8.

The EPS_ECU 8 sets a torque (assist torque) for assisting the steering torque applied to the steering wheel 4 by the driver based on pieces of data on the steering torque detected by the steering torque sensor 12 and the vehicle speed of the vehicle M detected by the vehicle speed sensor 13. By applying the assist torque to the steering shaft 5, steering assist for the driver is performed while reducing a load on the driver's steering operation.

The sensor devices that detect behavior of the vehicle M are coupled to the traveling control unit 24. The sensor devices include the vehicle speed sensor 13 that detects a vehicle speed, the yaw rate sensor 14 that detects a yaw rate and a lateral acceleration on a vehicle body, and the steering angle sensor 15 that detects a steering angle and a steering direction based on a rotation angle of the steering shaft 5.

The ALK_ECU 11a and the LDP_ECU 11b of the traveling control unit 24 execute traveling control including predetermined steering control as appropriate in response to outputs from the various sensor devices. The above is the schematic configuration of the drive assist apparatus 1 of this embodiment.

Figure 3:
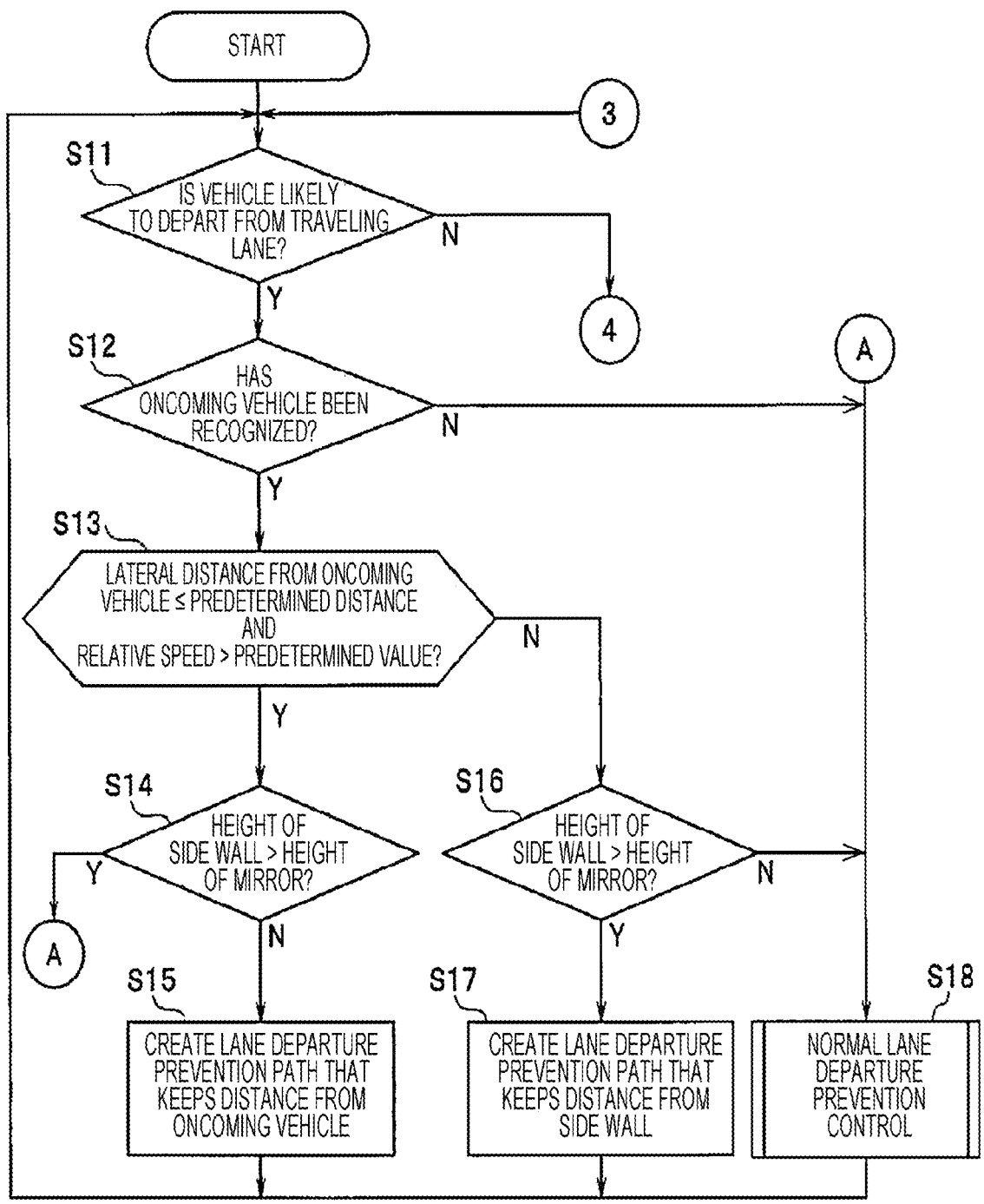
FIG. 3 is a flowchart illustrating an operation of the drive assist apparatus according to the embodiment of the disclosure (in a case where the vehicle is likely to depart from a lane)
Figure 4:
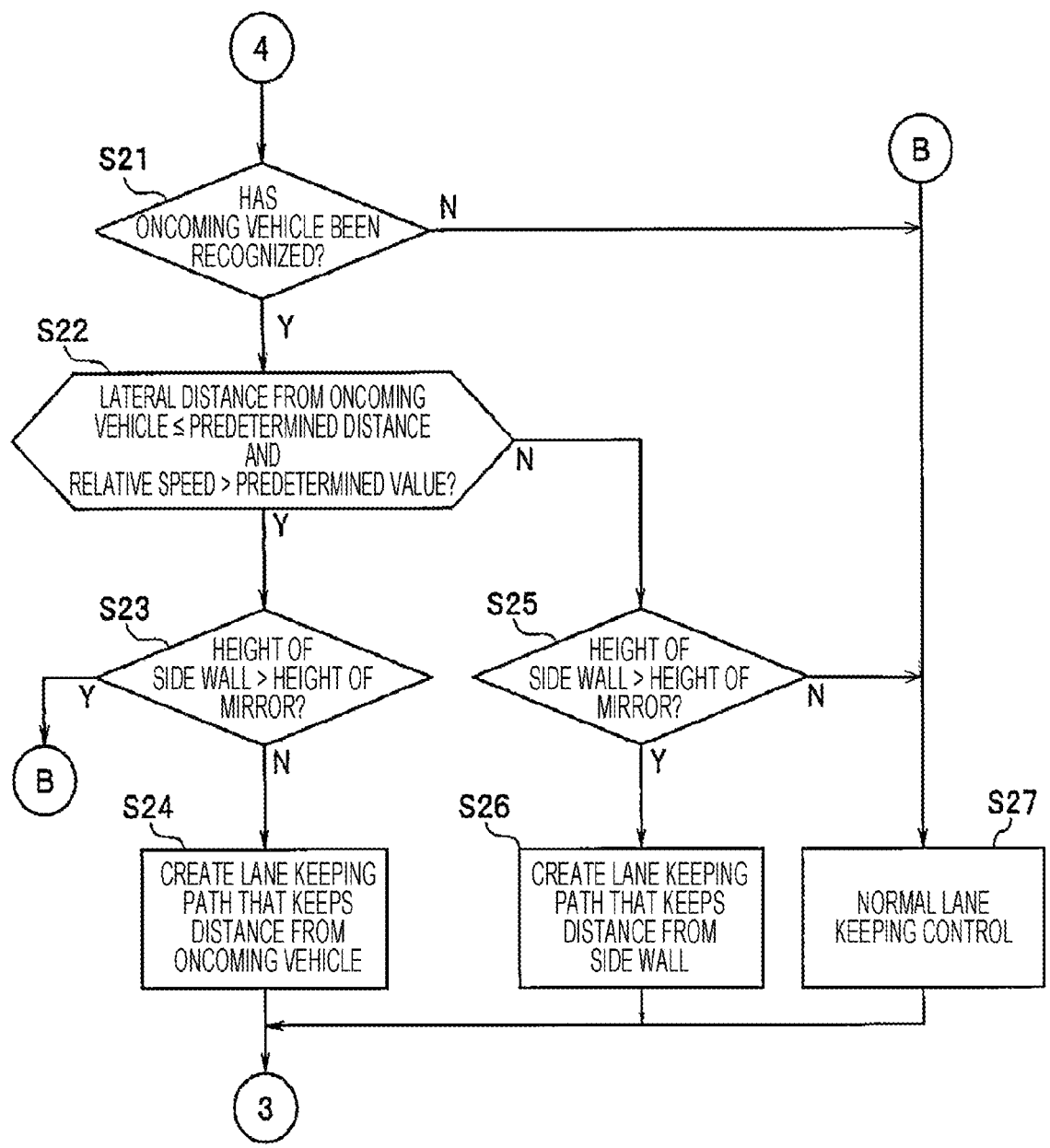
FIG. 4 is a flowchart illustrating an operation of the drive assist apparatus according to the embodiment of the disclosure (in a case where the vehicle is unlikely to depart from the lane)

Next, operations of the drive assist apparatus of this embodiment in the lane keeping traveling control and the lane departure prevention control are described with reference to FIG. 3 to FIG. 8. FIG. 3 is a flowchart illustrating an operation of the drive assist apparatus according to the embodiment of the disclosure when performing the lane keeping traveling control and the lane departure prevention control in a case where the vehicle is likely to depart from a lane in a leftward direction. FIG. 4 is a flowchart illustrating an operation of the drive assist apparatus according to the embodiment of the disclosure when performing the lane keeping traveling control and the lane departure prevention control in a case where the vehicle is unlikely to depart from the lane.

Figure 5:
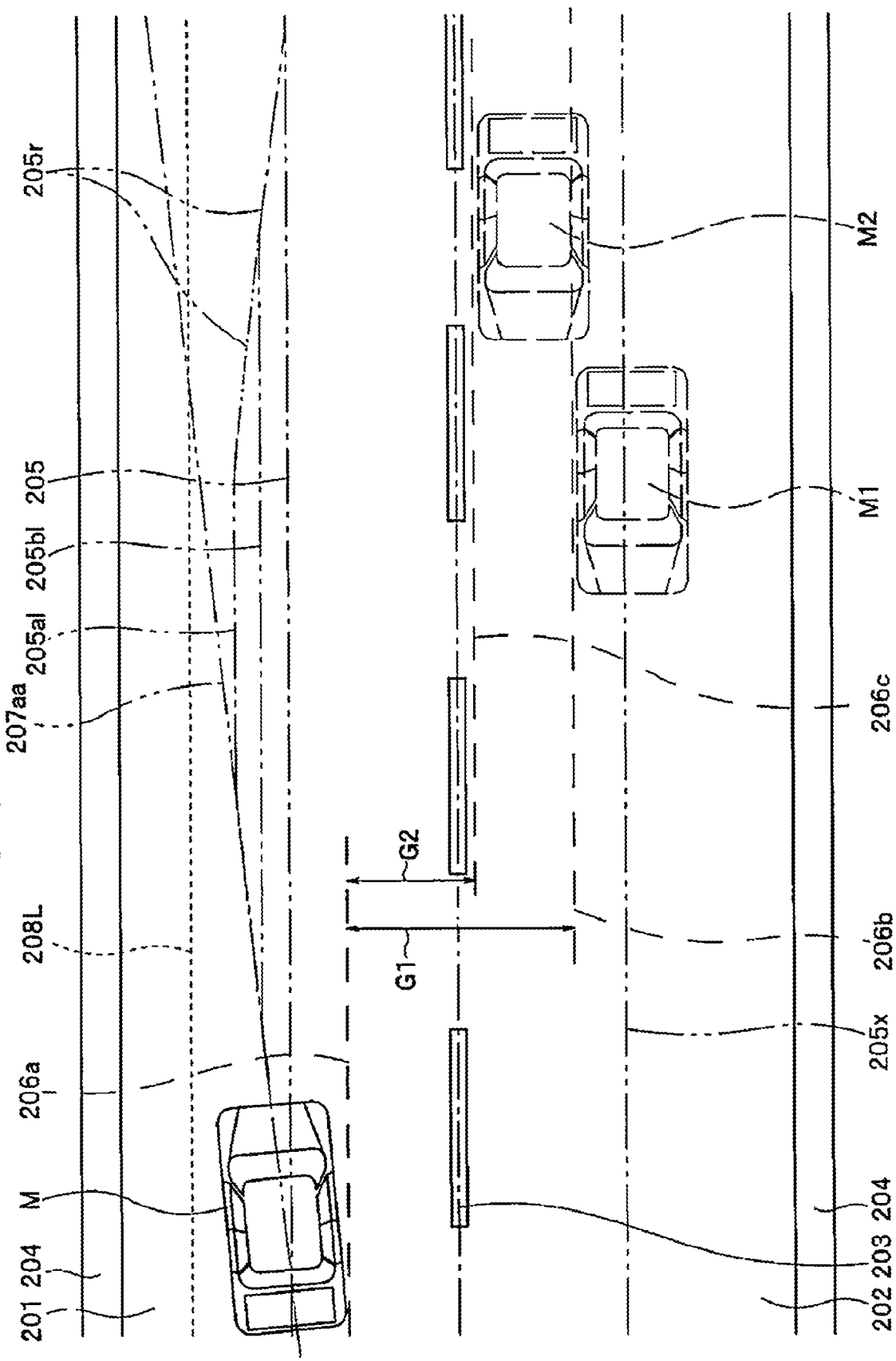
FIG. 5 is a conceptual diagram illustrating a situation in which the drive assist apparatus according to the embodiment of the disclosure performs lane keeping traveling control in a case where the vehicle is unlikely to depart from the lane in a leftward direction.
Figure 6:
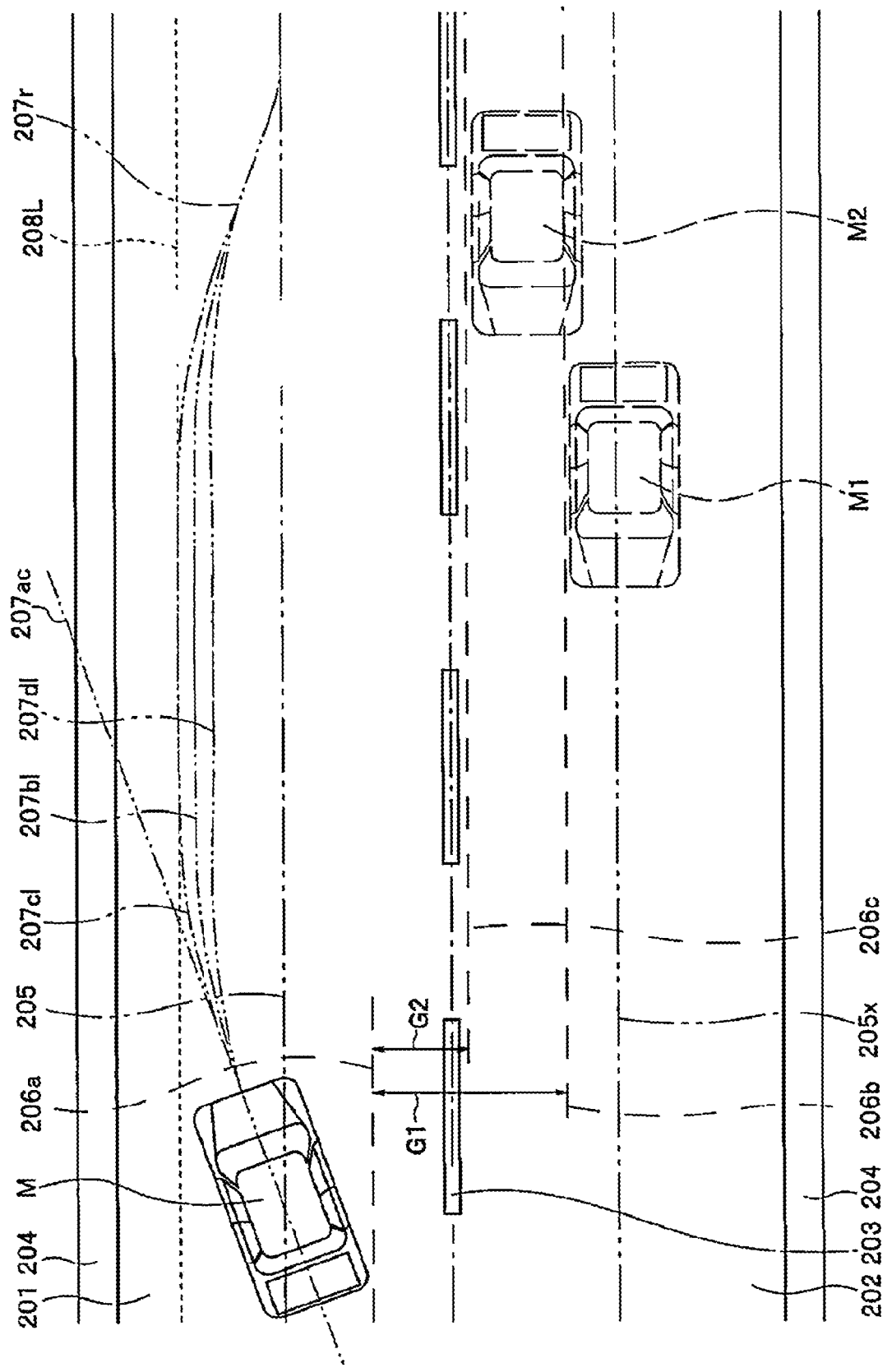
FIG. 6 is a conceptual diagram illustrating a situation in which the drive assist apparatus according to the embodiment of the disclosure performs lane departure prevention control in a case where the vehicle is likely to depart from the lane in the leftward direction.

FIG. 5 is a conceptual diagram illustrating a situation in which the drive assist apparatus according to the embodiment of the disclosure performs the lane keeping traveling control in a case where the vehicle is unlikely to depart from the lane in the leftward direction. FIG. 6 is a conceptual diagram illustrating a situation in which the drive assist apparatus according to the embodiment of the disclosure performs the lane departure prevention control in a case where the vehicle is likely to depart from the lane in the leftward direction.

Figure 7:
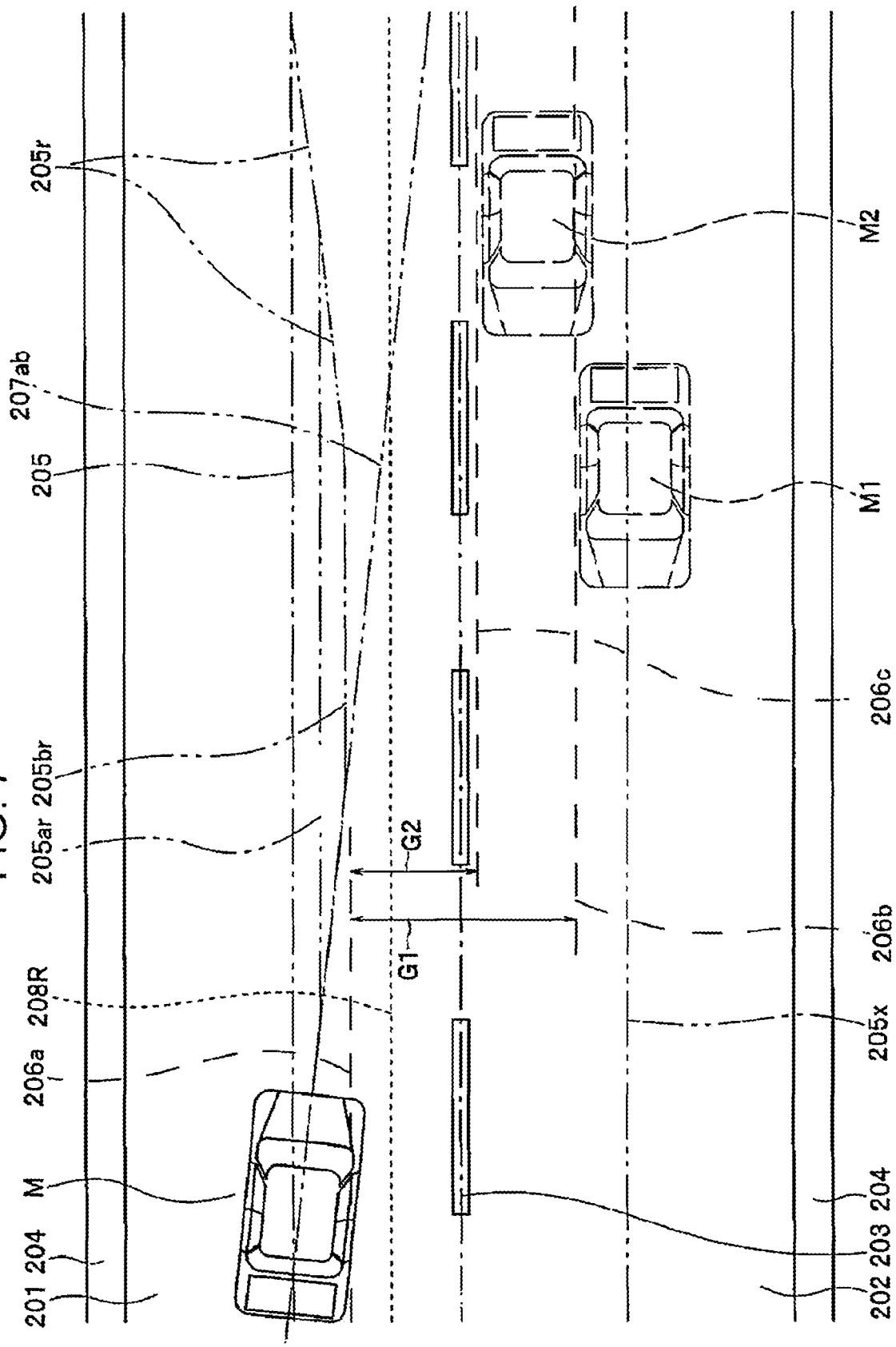
FIG. 7 is a conceptual diagram illustrating a situation in which the drive assist apparatus according to the embodiment of the disclosure performs the lane keeping traveling control in a case where the vehicle is unlikely to depart from the lane in a rightward direction.
Figure 8:
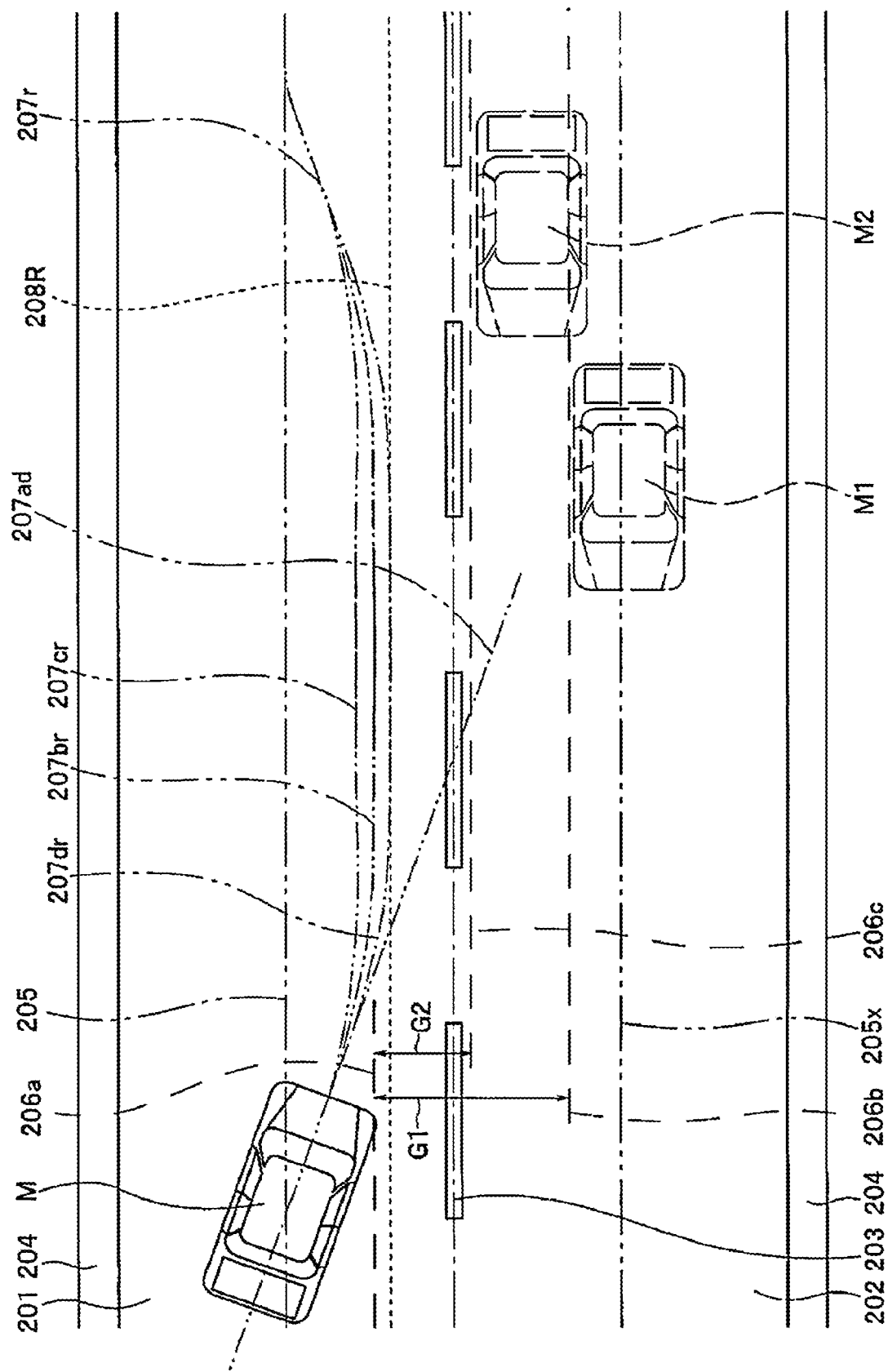
FIG. 8 is a conceptual diagram illustrating a situation in which the drive assist apparatus according to the embodiment of the disclosure performs the lane departure prevention control in a case where the vehicle is likely to depart from the lane in the rightward direction.

FIG. 7 is a conceptual diagram illustrating a situation in which the drive assist apparatus according to the embodiment of the disclosure performs the lane keeping traveling control in a case where the vehicle is unlikely to depart from the lane in a rightward direction. FIG. 8 is a conceptual diagram illustrating a situation in which the drive assist apparatus according to the embodiment of the disclosure performs the lane departure prevention control in a case where the vehicle is likely to depart from the lane in the rightward direction.

The following description of this embodiment is directed to a road system of left-hand traffic in which the traveling section of the vehicle is the left side as illustrated in FIG. 5 to FIG. 8. The configuration of the embodiment of the disclosure can easily be applied to a road system of right-hand traffic by switching right and left. In the following description of this embodiment, the right and left are defined under the assumption that the vehicle faces a target.

First, it is assumed that the vehicle M including the drive assist apparatus 1 according to the embodiment of the disclosure (hereinafter referred to as "vehicle M") is traveling along an ordinary road having no three-dimensional structure such as a median strip while executing the lane keeping traveling control. The vehicle M can further execute the lane departure prevention control at any time (that is, the lane departure prevention control is on standby). In this case, the traveling control unit 24 of the drive assist apparatus 1 of the traveling vehicle M continuously receives signals from the steering torque sensor 12. For example, when the steering torque sensor 12 detects a steering torque generated by a steering operation of the driver of the vehicle M, the traveling control unit 24 executes predetermined traveling control as appropriate based on the received detection result of the steering torque.

For example, the situations illustrated in FIG. 5 to FIG. 8 are assumed. Although details are described later, the exemplary situations illustrated in FIG. 5 and FIG. 7 are outlined as follows. For example, the lane keeping traveling control is executed when determination is made that the vehicle M is unlikely to depart from the lane in a case where the driver of the vehicle M executing the lane keeping traveling control is aware of either one of an oncoming vehicle (M1 or M2) and a vehicle parked or stopped in an oncoming lane (not illustrated; the traveling oncoming vehicle and the vehicle parked or stopped in the oncoming lane are hereinafter referred to collectively as "oncoming vehicle") and steers the vehicle M to avoid collision with the oncoming vehicle (M1 or M2), that is, steers the vehicle M in the leftward direction (toward a road shoulder), or in a case where the driver of the vehicle M is aware of a side wall 204 on the left side (near the road shoulder of the traveling lane) and steers the vehicle M in the rightward direction (toward a road center line).

The exemplary situations illustrated in FIG. 6 and FIG. 8 are outlined as follows. For example, the lane departure prevention control is executed when determination is made that the vehicle M is likely to depart from the lane in a case where the driver of the vehicle M executing the lane keeping traveling control is aware of the oncoming vehicle (M1 or M2) and steers the vehicle M to avoid collision with the oncoming vehicle (M1 or M2), that is, steers the vehicle M in the leftward direction (toward the road shoulder), or in a case where the driver of the vehicle M is aware of the side wall 204 on the left side (near the road shoulder of the traveling lane) and steers the vehicle M in the rightward direction (toward the road center line).

In FIG. 5 to FIG. 8, reference symbol 201 represents the traveling lane of the vehicle M (hereinafter referred to as "lane 201"). Reference symbol 202 represents the oncoming lane adjacent parallel to the lane 201. Reference symbol 203 represents the road center line between the lane 201 and the oncoming lane 202. In this case, the road center line 203 is a white broken line. At the left edge of the lane 201 (hereinafter referred to as "road shoulder side"), the side wall 204 is present along the lane 201. The side wall 204 is also present in the oncoming lane 202 on the road shoulder side of the oncoming vehicle (M1, M2; details are described later) traveling along the oncoming lane 202.

The vehicle M is traveling along the lane 201 of the road by the lane keeping traveling control. The drive assist apparatus 1 of the vehicle M sets a target lane keeping traveling path (imaginary line represented by reference symbol 205; two-dot chain line) at a predetermined position in the lane 201, and executes traveling control for causing the vehicle M to travel along the target lane keeping traveling path 205. The target lane keeping traveling path 205 is an imaginary line set based on a surrounding situation around the vehicle M. The target lane keeping traveling path 205 is normally set at a substantially central position in the lane 201.

In FIG. 5 to FIG. 8, reference symbols M1 and M2 represent the oncoming vehicles traveling along the oncoming lane 202. In the following description, the term "oncoming vehicle" means not only the traveling oncoming vehicles M1 and M2 but also a vehicle parked or stopped in the oncoming lane (not illustrated). In the following description, the simple terms "oncoming vehicle", "oncoming vehicle M1", "oncoming vehicle M2", and "oncoming vehicle (M1, M2)" may be replaced with terms "vehicle parked or stopped in oncoming lane" and "vehicle in oncoming lane" in the same meanings. The oncoming vehicle M1 represented by broken lines in FIG. 5 to FIG. 8 is traveling in the oncoming lane 202 along a target lane keeping traveling path 205x set at a substantially central position in the oncoming lane 202.

A distance between the vehicle M and the oncoming vehicle M1 (a distance in the lateral direction relative to the traveling directions of the vehicles M and M1, that is, a distance in the vehicle width direction) is, for example, a lateral distance G1 between an extension line 206a in the traveling direction along the right side of the vehicle M (represented by a broken line in FIG. 5 to FIG. 8) and an extension line 206b in the traveling direction along the right side of the oncoming vehicle M1 (represented by a broken line in FIG. 5 to FIG. 8).

The oncoming vehicle M2 represented by broken lines in FIG. 5 to FIG. 8 is traveling along an area near the road center line 203 in the oncoming lane 202. A distance between the vehicle M and the oncoming vehicle M2 (a distance in the lateral direction relative to the traveling directions of the vehicles, that is, a distance in the vehicle width direction) is, for example, a lateral distance G2 between the line 206a along the right side of the vehicle M (represented by the broken line in FIG. 5 to FIG. 8) and an extension line 206c in the traveling direction along the right side of the oncoming vehicle M2 (represented by a broken line in FIG. 5 to FIG. 8).

In FIG. 5 to FIG. 8, the oncoming vehicles M1 and M2 are not simultaneously present at the respective positions on the road. The oncoming vehicles M1 and M2 are illustrated in the same figure to demonstrate a difference in positional relationships in the lateral direction (vehicle width direction) between the vehicle M and the oncoming vehicles M1 and M2. Regarding positional relationships in a longitudinal direction (vehicle traveling direction) between the vehicle M and the oncoming vehicles M1 and M2, the oncoming vehicles M1 and M2 are illustrated with a shift in a fore-and-aft direction to avoid complication of the figures and to avoid overlapping in the figures. Therefore, the positional relationships in the longitudinal direction (vehicle traveling direction) between the vehicle M and the oncoming vehicles M1 and M2 are not limited to the relationships in the figures.

In the situations described above, the traveling control unit 24 of the drive assist apparatus 1 of the vehicle M checks in Step S11 of FIG. 3 whether the vehicle M is likely to depart from the current traveling lane (lane 201) in either one of the leftward direction and the rightward direction. Whether the vehicle M is likely to depart from the lane is determined based on a result output from the steering angle sensor 15.

For example, when the result output from the steering angle sensor 15 (steering angle) is not larger than a predetermined value, the vehicle M is presumed to travel along either one of a predicted leftward traveling path represented by reference symbol 207aa (two-dot chain line) in FIG. 5 and a predicted rightward traveling path represented by reference symbol 207ab (two-dot chain line) in FIG. 7. The predicted traveling path 207aa in FIG. 5 intersects a left departure determination lateral position imaginary line 208L (dotted line) preset in the lane 201 after an elapse of a predetermined relatively long period (see the situation in FIG. 5). The predicted traveling path 207ab in FIG. 7 intersects a right departure determination lateral position imaginary line 208R (dotted line) preset in the lane 201 after an elapse of the predetermined relatively long period (see the situation in FIG. 7).

In those situations, the vehicle M is presumed to take the predetermined relatively long period to depart from the lane 201 even if the vehicle M continues to travel while keeping the current steering angle (that is not larger than the predetermined value). That is, determination is made that the vehicle M is not expected to depart from the lane 201 within the predetermined period. In this case, the drive assist apparatus 1 determines that the vehicle M is unlikely to depart from the lane (see the situations in FIG. 5 and FIG. 7).

For example, when the result output from the steering angle sensor 15 (steering angle) is larger than the predetermined value, the vehicle M is presumed to travel along either one of a predicted leftward traveling path represented by reference symbol 207ac (two-dot chain line) in FIG. 6 and a predicted rightward traveling path represented by reference symbol 207ad (two-dot chain line) in FIG. 8. The predicted traveling path 207ac in FIG. 6 intersects the left departure determination lateral position imaginary line 208L (dotted line) preset in the lane 201 within a predetermined relatively short period (see the situation in FIG. 6). The predicted traveling path 207ad in FIG. 8 intersects the right departure determination lateral position imaginary line 208R (dotted line) preset in the lane 201 within the predetermined relatively short period (see the situation in FIG. 8).

In those situations, the vehicle M is presumed to depart from the lane 201 within the predetermined relatively short period if the vehicle M continues to travel while keeping the current steering angle (that is larger than the predetermined value). That is, determination is made that the vehicle M is expected to depart from the lane 201 within the predetermined period. In this case, the drive assist apparatus 1 determines that the vehicle M is likely to depart from the lane (see the situations in FIG. 6 and FIG. 8).

The departure determination lateral position imaginary lines 208L and 208R are set along the road shoulder of the lane 201 (for example, the side wall 204) and the center line 203 at a position near the road shoulder (side wall 204) and a position away from the center line 203 by a predetermined distance toward the lane 201, respectively. Determination is made that the vehicle M is likely to depart from the lane when the traveling path of the vehicle M is predicted to depart toward either one of the road shoulder and the center line 203 beyond the departure determination lateral position imaginary line 208L or 208R.

Referring back to FIG. 3, when determination is made in the process of Step S11 that the vehicle M is likely to depart from the lane 201, the process proceeds to Step S12. In processing steps subsequent to Step S12, the lane departure prevention control is performed to set a predetermined traveling path based on the surrounding situation as appropriate. When the vehicle M is likely to depart from the lane in the leftward direction, the situation corresponds to that in FIG. 6. When the vehicle M is likely to depart from the lane in the rightward direction, the situation corresponds to that in FIG. 8. The same control is performed for the leftward direction and for the rightward direction. Therefore, the flowchart is described for the cases of right and left.

When determination is made in the process of Step S11 that the vehicle M is unlikely to depart from the lane 201, the process proceeds to Step S21 of FIG. 4 (see connectors "4" in FIG. 3 and FIG. 4). In processing steps subsequent to Step S21 of FIG. 4, the lane keeping traveling control is performed to set a predetermined traveling path based on the surrounding situation as appropriate (see the situations in FIG. 5 and FIG. 7).

When the process proceeds to Step S12 through the determination that the vehicle M is likely to depart from the lane 201 in the process of Step S11 of FIG. 3 (situation in FIG. 6), the traveling control unit 24 checks whether any oncoming vehicle (M1 or M2) has been recognized based on information output from the surrounding situation information acquisition device (22, 23). When the oncoming vehicle (M1 or M2) has been recognized, the process proceeds to Step S13. When the oncoming vehicle (M1 or M2) has not been recognized, the process proceeds to Step S18.

Examples of the oncoming vehicle to be recognized by the drive assist apparatus 1 of the vehicle M in this situation include the oncoming vehicles represented by reference symbols M1 and M2 in FIG. 6 and FIG. 8. It is assumed that either one of the oncoming vehicles M1 and M2 is recognized by the vehicle M in this situation. Although illustration is omitted for a situation in which no oncoming vehicle has been recognized, it is assumed that the oncoming vehicle (M1 or M2) in FIG. 6 and FIG. 8 is not present.

In Step S13, the traveling control unit 24 detects a lateral distance (G1 or G2) between the vehicle M and the recognized oncoming vehicle (M1 or M2) and a relative speed between the vehicle M and the oncoming vehicle (M1 or M2) based on the information output from the surrounding situation information acquisition device (22, 23), and makes determination about the detected distance value and the detected relative speed value.

Examples of the determination include determination as to whether the lateral distance (G1 or G2) between the vehicle M and the oncoming vehicle (M1 or M2) is equal to or shorter than a predetermined threshold and the relative speed between the vehicle M and the oncoming vehicle (M1 or M2) is higher than a predetermined threshold.

The predetermined thresholds of the lateral distance (G1 or G2) between the vehicle M and the oncoming vehicle (M1 or M2) and the relative speed between the vehicle M and the oncoming vehicle (M1 or M2) are a distance and a speed at which the driver of the vehicle M does not feel pressure from the oncoming vehicle (M1 or M2) when the vehicle M and the oncoming vehicle (M1 or M2) pass each other.

Examples of the threshold of the lateral distance between the vehicle and the oncoming vehicle include a distance corresponding to the width dimension of the vehicle (for example, 1.5 m). Examples of the threshold of the relative speed between the vehicle and the oncoming vehicle passing each other include 100 km/h when the vehicle and the oncoming vehicle are traveling at general traveling speeds (for example, 50 km/h) on an ordinary road.

The situation in which the oncoming vehicle M2 has been recognized in FIG. 6 and FIG. 8 is assumed as a situation that satisfies the two conditions (lateral distance and relative speed). In this situation, the lateral distance G2 between the vehicle M and the oncoming vehicle M2 is shorter than the predetermined threshold and the relative speed is higher than the predetermined threshold. Therefore, when the vehicle M and the oncoming vehicle M2 pass each other, the driver of the vehicle M may feel pressure from the oncoming vehicle M2. The driver may feel greater pressure from the oncoming vehicle M2 as the distance from the oncoming vehicle M2 decreases and as the relative speed increases.

In the situation that satisfies the two conditions when the traveling vehicle M and the traveling oncoming vehicle M2 pass each other, a high avoidance priority level can be estimated in consideration of a collision possibility and the like. When the two conditions are satisfied in Step S13, the process proceeds to Step S14.

The situation in which the oncoming vehicle M1 has been recognized in FIG. 6 and FIG. 8 is assumed as a situation that does not satisfy the two conditions in Step S13. In this situation, the lateral distance G1 between the vehicle M and the oncoming vehicle M1 is longer than the predetermined threshold or the relative speed is lower than the predetermined threshold. Therefore, when the vehicle M and the oncoming vehicle M1 pass each other in the situation that does not satisfy the two conditions, the driver of the vehicle M may feel relatively small pressure, and a low avoidance priority level can be estimated. When the two conditions are not satisfied in Step S13, the process proceeds to Step S16.

In Step S16, the traveling control unit 24 determines whether the height of the side wall 204 along the road shoulder of the traveling lane 201 is larger than a predetermined threshold. In this embodiment, the height of the side wall 204 is compared with the height of an outer rearview mirror of the vehicle M (not illustrated; "mirror" in FIG. 3; hereinafter referred to simply as "mirror") to determine whether the height of the side wall 204 is larger than the height of the mirror of the vehicle M.

In this case, the height of the side wall 204 is information obtained based on the information output from the surrounding situation information acquisition device (22, 23). The height of the mirror of the vehicle M is numerical information unique to the vehicle M, and is obtained by referring to data prestored in, for example, a storage device (not illustrated) in the traveling control unit 24.

The height of the mirror of the vehicle may be set substantially equal to the height of the driver's line of sight in the horizontal direction. In the situation in which the height of the side wall 204 on the road shoulder side of the traveling vehicle M is larger than the height of the mirror of the vehicle M (that is, the height of the driver's line of sight), the driver may feel pressure from the side wall 204. The driver may feel greater pressure from the side wall 204 as the side wall 204 is taller.

In the situation in which the side wall 204 on the road shoulder side is tall while the vehicle M is traveling along the side wall 204, a high avoidance priority level can be estimated in consideration of a collision possibility and the like. When determination is made in Step S16 that the height of the side wall 204 is larger than the height of the mirror of the vehicle M, the drive assist apparatus 1 of the vehicle M recognizes the side wall 204 as a collision avoidance target, and the process proceeds to Step S17. When determination is made that the height of the side wall 204 is smaller than the height of the mirror of the vehicle M, the process proceeds to Step S18.

In Step S17, the traveling control unit 24 performs control for creating a new target lane departure prevention traveling path ("lane departure prevention path" in FIG. 3) at a position where the vehicle M keeps distance from the side wall 204 in the lateral direction compared with a target lane departure prevention traveling path during normal control. Then, the process returns to Step S11 to continue the lane keeping traveling control.

For example, when the vehicle M is likely to depart from the lane in the leftward direction, the process of Step S17 (for creating the lane departure prevention path against the side wall) is performed in the following situation. In FIG. 6, a traveling path represented by reference symbol 207*bl* is the target lane departure prevention traveling path during the normal control. A traveling path represented by reference symbol 207*dl* is a target lane departure prevention traveling path against a road shoulder-side avoidance target such as the side wall 204 when the predicted traveling path is on the left side (see reference symbol 207*ac* in FIG. 6) because the driver steers the vehicle M leftward while being aware of the oncoming vehicle. The target lane departure prevention traveling path 207*dl* is created away from the side wall 204 in the lateral direction compared with the normal target lane departure prevention traveling path 207*bl*.

In this situation, the vehicle M is likely to depart from the lane 201 in the leftward direction ("Y" in Step S11), the oncoming vehicle (M1 or M2) has been recognized ("Y" in Step S12), the two conditions (lateral distance and relative speed) are not satisfied in the process of Step S13 ("N" in Step S13) (thus, the oncoming vehicle M1 has been recognized), and determination is made that the height of the side wall 204 on the road shoulder side is larger than the height of the mirror of the vehicle M ("Y" in Step S16). That is, the oncoming vehicle M1 has been recognized and the height of the side wall 204 is larger than the mirror height of the vehicle M.

At this time, control is performed to create the new target lane departure prevention traveling path 207*dl* where the vehicle M travels away from the side wall 204 compared with the target lane departure prevention traveling path 207*bl* during the normal control. Since the lateral distance is longer than the predetermined threshold or the relative speed is lower than the predetermined threshold, a low avoidance priority level can be estimated for the oncoming vehicle M1 recognized by the drive assist apparatus 1 of the vehicle M. Since determination is made that the height of the side wall 204 is larger than the predetermined threshold, a high avoidance priority level can be estimated for the side wall 204. Therefore, the driver may feel small pressure from the oncoming vehicle M1 even if the new target lane departure prevention traveling path 207*dl* is set at the position where the vehicle M keeps distance from the side wall 204 (that is, a predetermined position closer to the oncoming lane 202) compared with the target lane departure prevention traveling path 207*bl* during the normal control. Since the new target lane departure prevention traveling path 207*dl* is set at the position where the vehicle M keeps distance from the side wall 204 compared with the target lane departure prevention traveling path 207*bl* during the normal control, the pressure felt by the driver from the side wall 204 can be reduced.

When the vehicle M is likely to depart from the lane in the rightward direction, the process of Step S17 (for creating the lane departure prevention path against the side wall) is performed in the following situation. In FIG. 8, a traveling path represented by reference symbol 207*dr* is a target lane departure prevention traveling path against the road shoulder-side avoidance target such as the side wall 204 when the predicted traveling path is on the right side (see reference symbol 207*ad* in FIG. 8) because the driver steers the vehicle M rightward while being aware of the side wall. The target lane departure prevention traveling path 207*dr* is created away from the side wall 204 in the lateral direction compared with a normal target lane departure prevention traveling path 207*br*.

Since the lateral distance is longer than the predetermined threshold or the relative speed is lower than the predetermined threshold in this situation, a low avoidance priority level can be estimated for the oncoming vehicle M1 recognized by the drive assist apparatus 1 of the vehicle M. Since determination is made that the height of the side wall 204 is larger than the predetermined threshold, a high avoidance priority level can be estimated for the side wall 204. By setting the new target lane departure prevention traveling path 207*dr*, the pressure felt by the driver from the side wall 204 can be reduced.

The traveling control unit 24 controls the vehicle M to travel along the new target lane departure prevention traveling path 207*dl* or 207*dr*. When the side wall 204 is no longer recognized afterwards, traveling control is performed to return the vehicle M to the original target lane keeping traveling path 205 as represented by reference symbol 207*r* in FIG. 6 and FIG. 8.

When either one of the side wall 204 on the road shoulder side and the oncoming vehicle M1 is recognized at the time of performing the lane departure prevention control in view of the case where the driver steers the vehicle M in the leftward direction while being aware of the oncoming vehicle or in the rightward direction while being aware of the side wall 204, the new target lane departure prevention traveling path 207*dl* or 207*dr* is created in consideration of the height of the side wall 204 and the oncoming vehicle M1. Since the new target lane departure prevention traveling path 207*dl* or 207*dr* is set at the position where the vehicle M keeps distance from the side wall 204 compared with the normal target lane departure prevention traveling path 207*bl* or 207*br*, the driver can avoid the pressure from the oncoming vehicle M1 and can reduce the pressure from the side wall 204. In this case, the driver does not feel discomfort from the lane departure prevention control.

When the process proceeds to Step S14 through the determination that the two conditions (lateral distance and relative speed) are satisfied in Step S13, the traveling control unit 24 determines whether the height of the side wall 204 is larger than the height of the mirror of the vehicle M similarly to Step S16. When determination is made that the height of the side wall 204 is larger than the height of the mirror of the vehicle M, the process proceeds to Step S18 (see a connector "A" in FIG. 3). When determination is made that the height of the side wall 204 is smaller than the height of the mirror of the vehicle M, the process proceeds to Step S15.

In Step S15, the traveling control unit 24 performs control for creating a new target lane departure prevention traveling path ("lane departure prevention path" in FIG. 3) at a position where the vehicle M keeps distance from the oncoming vehicle M2 in the lateral direction. Then, the process returns to Step S11 to continue the lane keeping traveling control.

For example, when the vehicle M is likely to depart from the lane in the leftward direction, the process of Step S15 (for creating the lane departure prevention path against the oncoming vehicle) is performed in the following situation. In FIG. 6, a traveling path represented by reference symbol 207*cl* is a target lane departure prevention traveling path during control against the oncoming vehicle when the predicted traveling path is on the left side (see reference symbol 207*ac* in FIG. 6) because the driver steers the vehicle M leftward while being aware of the oncoming vehicle. The target lane departure prevention traveling path 207*cl* is created away from the oncoming vehicle M2 in the lateral direction compared with the normal target lane departure prevention traveling path 207*bl*. In this situation, the vehicle M is likely to depart from the lane 201 in the leftward direction ("Y" in Step S11), the oncoming vehicle (M1 or M2) has been recognized ("Y" in Step S12), the two conditions (lateral distance and relative speed) are satisfied in the process of Step S13 ("Y" in Step S13) (thus, the oncoming vehicle M2 has been recognized), and determination is made that the height of the side wall 204 on the road shoulder side is smaller than the height of the mirror of the vehicle M ("N" in Step S14). That is, the oncoming vehicle M2 has been recognized and the height of the side wall 204 is smaller than the mirror height of the vehicle M.

In this case, control is performed to create the new target lane departure prevention traveling path 207*cl* where the vehicle M travels away from the oncoming vehicle M compared with the target lane departure prevention traveling path 207*bl* during the normal control. Since the lateral distance is shorter than the predetermined threshold and the relative speed is higher than the predetermined threshold, a high avoidance priority level can be estimated for the oncoming vehicle M2 recognized by the drive assist apparatus 1 of the vehicle M. Since determination is made that the height of the side wall 204 is smaller than the predetermined threshold, a low avoidance priority level can be estimated for the side wall 204. Therefore, the driver may feel small pressure from the side wall 204 even if the new target lane departure prevention traveling path 207*cl* is set at the position where the vehicle M keeps distance from the oncoming vehicle M2 (that is, a predetermined position closer to the side wall 204) compared with the target lane departure prevention traveling path 207*bl* during the normal control. Since the new target lane departure prevention traveling path 207*cl* is set at the position where the vehicle M keeps distance from the oncoming vehicle M2 compared with the target lane departure prevention traveling path 207*bl* during the normal control, the pressure felt by the driver from the oncoming vehicle M2 can be reduced. For example, when the vehicle M is likely to depart from the lane in the rightward direction, the process of Step S15 (for creating the lane departure prevention path against the oncoming vehicle) is performed in the following situation. In FIG. 8, a traveling path represented by reference symbol 207*cr* is a target lane departure prevention traveling path during control against the oncoming vehicle when the predicted traveling path is on the right side (see reference symbol 207*ad* in FIG. 8) because the driver steers the vehicle M rightward while being aware of the side wall. The target lane departure prevention traveling path 207*cr* is created at a position where the vehicle M keeps distance from the oncoming vehicle M2 in the lateral direction (that is, a predetermined position closer to the side wall 204) compared with the normal target lane departure prevention traveling path 207*br*.

Since the lateral distance is shorter than the predetermined threshold and the relative speed is higher than the predetermined threshold in this situation, a high avoidance priority level can be estimated for the oncoming vehicle M2 recognized by the drive assist apparatus 1 of the vehicle M. Since determination is made that the height of the side wall 204 is smaller than the predetermined threshold, a low avoidance priority level can be estimated for the side wall 204. By setting the new target lane departure prevention traveling path 207*cr*, the pressure felt by the driver from the oncoming vehicle M2 can be reduced.

The traveling control unit 24 controls the vehicle M to travel along the new target lane departure prevention traveling path 207*cl* or 207*cr*. When the oncoming vehicle M2 is no longer recognized afterwards, traveling control is performed to return the vehicle M to the original target lane keeping traveling path 205 as represented by reference symbol 207*r* in FIG. 6 and FIG. 8.

When the oncoming vehicle M2 is recognized at the time of performing the lane departure prevention control in view of the case where the driver steers the vehicle M in the leftward direction while being aware of the oncoming vehicle or in the rightward direction while being aware of the side wall 204, the new target lane departure prevention traveling path 207*cl* or 207*cr* is created in consideration of the oncoming vehicle M2 and the height of the side wall 204. Since the new target lane departure prevention traveling path 207*cl* or 207*cr* is set at the position where the vehicle M keeps distance from the oncoming vehicle M2 compared with the normal target lane departure prevention traveling path 207*bl* or 207*br*, the driver can avoid the pressure from the side wall 204 and the oncoming vehicle M2, and does not feel discomfort from the lane departure prevention control.

When the oncoming vehicle has not been recognized in the process of Step S12, when determination is made in the process of Step S14 that the height of the side wall 204 on the road shoulder side of the vehicle M is larger than the height of the mirror of the vehicle M (see the connector "A" in FIG. 3), or when determination is made in the process of Step S16 that the height of the side wall 204 on the road shoulder side of the vehicle M is smaller than the height of the mirror of the vehicle M, the process proceeds to Step S18. In Step S18, the traveling control unit 24 executes normal lane departure prevention control.

When determination is made in the process of Step S14 that the height of the side wall 204 on the road shoulder side of the vehicle M is larger than the height of the mirror of the vehicle M (see the connector "A" in FIG. 3), determination is made in the process of Step S13 that the two determination conditions (lateral distance and relative speed) related to the oncoming vehicle (M1 or M2) are satisfied (that is, the oncoming vehicle M2 has been recognized).

Therefore, the oncoming vehicle M2 and the side wall 204 on the road shoulder side are simultaneously taken into consideration in the drive assist apparatus 1 of this embodiment. In this case, the vehicle M can estimate high avoidance priority levels for both the oncoming vehicle M2 and the side wall 204. Thus, the normal lane departure prevention control is executed instead of the control for causing the vehicle M to travel along the rightward or leftward traveling path. The normal target lane departure prevention traveling path 207*bl* is created and the vehicle M is controlled to travel along the normal target lane departure prevention traveling path 207*bl*.

When determination is made in the process of Step S16 that the height of the side wall 204 on the road shoulder side of the vehicle M is smaller than the height of the mirror of the vehicle M, determination is made in the process of Step S13 that the two determination conditions (lateral distance and relative speed) related to the oncoming vehicle (M1 or M2) are not satisfied.

Therefore, the drive assist apparatus 1 of this embodiment can presume a situation in which the oncoming vehicle M2 and the side wall 204 on the road shoulder side are not taken into consideration. In this situation, the normal lane departure prevention control is executed. The normal target lane departure prevention traveling path 207*bl* is created and the vehicle M is controlled to travel along the normal target lane departure prevention traveling path 207*bl*.

When the oncoming vehicle has not been recognized in the process of Step S12, it can be presumed that the driver does not steer with intention but steers due to, for example, driver's inattentiveness. In this case, the normal target lane departure prevention traveling path 207*bl* is created and the vehicle M is controlled to travel along the normal target lane departure prevention traveling path 207*bl*.

Then, the traveling control is performed to return the vehicle M to the original target lane keeping traveling path 205 through the traveling path represented by reference symbol 207*r* in FIG. 6. When the oncoming vehicle has been recognized in the processing step before Step S18 ("Y" in Step S12), the traveling control is performed to return the vehicle M to the original target lane keeping traveling path 205 after the oncoming vehicle is no longer recognized. Then, the process returns to Step S11 to continue the lane keeping traveling control.

When determination is made in the process of Step S11 of FIG. 3 that the vehicle M is unlikely to depart from the lane 201, the process proceeds to Step S21 of FIG. 4. In the processing steps subsequent to Step S21, the lane keeping traveling control for the case where the vehicle M is unlikely to depart from the lane is performed to set a predetermined traveling path based on the surrounding situation as appropriate.

In Step S21 of FIG. 4, the traveling control unit 24 performs the same process as that in Step S12. That is, the traveling control unit 24 checks whether any oncoming vehicle (M1 or M2) has been recognized. When the oncoming vehicle (M1 or M2) has been recognized, the process proceeds to Step S22. When the oncoming vehicle (M1 or M2) has not been recognized, the process proceeds to Step S27.

Examples of the oncoming vehicle to be recognized by the drive assist apparatus 1 of the vehicle M in this situation include the oncoming vehicles represented by reference symbols M1 and M2 in FIG. 5 and FIG. 7 similarly to FIG. 6 and FIG. 8 (Step S12 of FIG. 3). It is assumed that either one of the oncoming vehicles M1 and M2 is recognized by the vehicle M in this situation. Although illustration is omitted for a situation in which no oncoming vehicle has been recognized, it is assumed that the oncoming vehicle (M1 or M2) in FIG. 5 and FIG. 7 is not present.

In Step S22 of FIG. 4, the traveling control unit 24 performs the same process as that in Step S13. In Step S22, the traveling control unit 24 detects a lateral distance (G1 or G2) between the vehicle M and the oncoming vehicle (M1 or M2) and a relative speed between the vehicle M and the oncoming vehicle (M1 or M2), and makes determination about the detected distance value and the detected relative speed value.

When determination is made in Step S22 that the two conditions (lateral distance and relative speed) are satisfied, the process proceeds to Step S23. When the two conditions are not satisfied, the process proceeds to Step S25.

In Step S23, the traveling control unit 24 performs the same process as that in Step S14. In Step S23, the traveling control unit 24 determines whether the height of the side wall 204 is larger than the height of the mirror of the vehicle M. When determination is made that the height of the side wall 204 is larger than the height of the mirror of the vehicle M, the process proceeds to Step S27 (see a connector "B" in FIG. 4). When determination is made that the height of the side wall 204 is smaller than the height of the mirror of the vehicle M, the process proceeds to Step S24.

In Step S24, the traveling control unit 24 performs control for creating a new target lane keeping traveling path ("lane keeping path" in FIG. 4) at a position where the vehicle M keeps distance from the oncoming vehicle M2. Then, the process returns to Step S11 to continue the lane keeping traveling control (see connectors "3" in FIG. 4 and FIG. 3).

For example, when the vehicle M is traveling along the predicted leftward traveling path 207*aa* (FIG. 5), the process of Step S24 (for creating the lane keeping path against the oncoming vehicle) is performed in the following situation. In FIG. 5, a traveling path represented by reference symbol 205 is a target lane keeping traveling path during normal control. In FIG. 5, a traveling path represented by reference symbol 205*al* is a target lane keeping traveling path during control against the oncoming vehicle when the predicted traveling path is on the left side (see reference symbol 207*aa* in FIG. 5) because the driver steers the vehicle M leftward while being aware of the oncoming vehicle. The target lane keeping traveling path 205*al* is created away from the oncoming vehicle M2 in the lateral direction compared with the normal target lane keeping traveling path 205. In this situation, the vehicle M is unlikely to depart from the lane 201 ("N" in Step S11 of FIG. 3), the oncoming vehicle (M1 or M2) has been recognized ("Y" in Step S21 of FIG. 4), the two conditions (lateral distance and relative speed) are satisfied in the process of Step S22 ("Y" in Step S22) (thus, the oncoming vehicle M2 has been recognized), and determination is made that the height of the side wall 204 on the road shoulder side is smaller than the height of the mirror of the vehicle M ("N" in Step S23). That is, the oncoming vehicle M2 has been recognized and the height of the side wall 204 is smaller than the mirror height of the vehicle M.

In this case, control is performed to create the new target lane keeping traveling path 205*al* where the vehicle M travels away from the oncoming vehicle M2 compared with the target lane keeping traveling path 205 during the normal control. Since the lateral distance is shorter than the predetermined threshold and the relative speed is higher than the predetermined threshold, a high avoidance priority level can be estimated for the oncoming vehicle M2 recognized by the drive assist apparatus 1 of the vehicle M.

Since determination is made that the height of the side wall 204 is smaller than the predetermined threshold, a low avoidance priority level can be estimated for the side wall 204. Therefore, the driver may feel small pressure from the side wall 204 even if the new target lane keeping traveling path 205*al* is set at the position where the vehicle M keeps distance from the oncoming vehicle M2 (that is, a predetermined position closer to the side wall 204) compared with the target lane keeping traveling path 205 during the normal control.

Since the new target lane keeping traveling path 205*al* is set at the position where the vehicle M keeps distance from the oncoming vehicle M2 compared with the target lane keeping traveling path 205 during the normal control, the pressure felt by the driver from the oncoming vehicle M2 can be reduced.

For example, when the vehicle M is traveling along the predicted rightward traveling path 207*ab* (FIG. 7), the process of Step S24 (for creating the lane keeping path against the oncoming vehicle) is performed in the following situation. In FIG. 7, a traveling path represented by reference symbol 205 is the target lane keeping traveling path during the normal control. In FIG. 7, a traveling path represented by reference symbol 205*ar* is a target lane keeping traveling path during control against the oncoming vehicle when the predicted traveling path is the path represented by reference symbol 207*ab* in FIG. 7 because the driver steers the vehicle M rightward while being aware of the side wall. The target lane keeping traveling path 205*ar* is created at a position where the vehicle M keeps distance from the side wall 204 in the lateral direction compared with the normal target lane keeping traveling path 205 and keeps distance from the oncoming vehicle M2 compared with a target lane keeping traveling path 205*br* during control against the side wall (details are described later).

Since the lateral distance is shorter than the predetermined threshold and the relative speed is higher than the predetermined threshold in this situation, a high avoidance priority level can be estimated for the oncoming vehicle M2 recognized by the drive assist apparatus 1 of the vehicle M.

Since determination is made that the height of the side wall 204 is smaller than the predetermined threshold, a low avoidance priority level can be estimated for the side wall 204. By setting the new target lane keeping traveling path 205*ar*, the pressure felt by the driver from the oncoming vehicle M2 and the side wall 204 can be reduced.

The traveling control unit 24 controls the vehicle M to travel along the new target lane keeping traveling path 205*a*1 or 205*ar*. When the oncoming vehicle M2 is no longer recognized afterwards, traveling control is performed to return the vehicle M to the original target lane keeping traveling path 205 as represented by reference symbol 205*r* in FIG. 5 and FIG. 7.

When determination is made that the vehicle M is unlikely to depart from the lane ("N" in Step S11 of FIG. 3) to perform the subsequent processing steps of FIG. 4, that is, the lane keeping control, the oncoming vehicle (M1 or M2) has been recognized ("Y" in Step S21), and the relationship between the recognized oncoming vehicle (M1 or M2) and the vehicle M satisfies the two conditions (lateral distance and relative speed) ("Y" in Step S22), the oncoming vehicle is recognized as the oncoming vehicle M2 in FIG. 5 and FIG. 7.

When the height of the side wall 204 is smaller than the mirror height of the vehicle M ("N" in Step S23) and the predicted traveling path is the path represented by reference symbol 207*aa* in FIG. 5, the new target lane keeping traveling path 205*al* for shifting the vehicle M closer to the road shoulder compared with the normal target lane keeping traveling path 205 is created while reflecting the driver's intention. The new target lane keeping traveling path 205*al* is created away from the oncoming vehicle M2 in the lateral direction compared with the target lane keeping traveling path 205 during the normal control.

When the height of the side wall 204 is smaller than the mirror height of the vehicle M ("N" in Step S23) and the predicted traveling path is the path represented by reference symbol 207*ab* in FIG. 7, the new target lane keeping traveling path 205*ar* is created at the position where the vehicle M is shifted closer to the right side compared with the normal target lane keeping traveling path 205 (for example, the position where the vehicle M keeps distance from the side wall 204 compared with the normal target lane keeping traveling path 205 and keeps distance from the oncoming vehicle M2 compared with the target lane keeping traveling path 205*br* during the control against the side wall (details are described later)).

In other words, when determination is made that the vehicle M is unlikely to depart from the lane to perform the lane keeping control though the driver steers the vehicle M leftward while being aware of the oncoming vehicle or rightward while being aware of the side wall 204, the oncoming vehicle M2 has been recognized, and the height of the side wall 204 is small, the new target lane keeping traveling path 205*al* or 205*ar* is created at the predetermined position where the vehicle M is shifted closer to either one of the road shoulder and the right side and keeps distance from either one of the oncoming vehicle M2 and the side wall 204 in the lateral direction compared with the normal target lane keeping traveling path 205. The new target lane keeping traveling path 205*al* or 205*ar* is the target lane keeping traveling path during the control against the oncoming vehicle.

In this case, the vehicle M appropriately performs the lane keeping control along the new target lane keeping traveling path 205*al* or 205*ar* set at the position where the vehicle M keeps distance from the oncoming vehicle M2 in the lateral direction while exhibiting behavior as intended by the driver's steering (traveling leftward or rightward). Thus, the driver does not feel discomfort.

When the process proceeds to Step S25 in the case where the two conditions are not satisfied in Step S22, the traveling control unit 24 performs the same process as that in Step S16. In Step S25, the traveling control unit 24 determines whether the height of the side wall 204 is larger than the height of the mirror of the vehicle M. When determination is made that the height of the side wall 204 is larger than the height of the mirror of the vehicle M, the process proceeds to Step S26. When determination is made that the height of the side wall 204 is smaller than the height of the mirror of the vehicle M, the process proceeds to Step S27.

In Step S26, the traveling control unit 24 performs control for creating a new target lane keeping traveling path ("lane keeping path" in FIG. 4) at a position where the vehicle M keeps distance from the oncoming vehicle M2 in the lateral direction compared with the normal target lane keeping traveling path 205 and keeps distance from the side wall 204 in the lateral direction compared with the target lane keeping traveling paths 205*al* and 205*ar* during the control against the oncoming vehicle. Then, the process returns to Step S11 to continue the lane keeping traveling control (see the connectors "3" in FIG. 4 and FIG. 3).

For example, when the vehicle M is traveling along the predicted leftward traveling path 207*aa* (FIG. 5), the process of Step S26 (for creating the lane keeping path against the side wall) is performed in the following situation. In FIG. 5, a traveling path represented by reference symbol 205*bl* is a target lane keeping traveling path against the road shoulder-side avoidance target such as the side wall 204 when the predicted traveling path is on the left side (see reference symbol 207*aa* in FIG. 5) because the driver steers the vehicle M leftward while being aware of the oncoming vehicle. In response to the leftward steering, the target lane keeping traveling path 205*bl* is created at a position where the vehicle M keeps distance from the oncoming vehicle M2 in the lateral direction compared with the normal target lane keeping traveling path 205 and keeps distance from the side wall 204 in the lateral direction compared with the target lane keeping traveling path 205*al* during the control against the oncoming vehicle. In this situation, the vehicle M is unlikely to depart from the lane 201 ("N" in Step S11 of FIG. 3), the oncoming vehicle (M1 or M2) has been recognized ("Y" in Step S21 of FIG. 4), the two conditions (lateral distance and relative speed) are not satisfied in the process of Step S22 ("N" in Step S22) (thus, the oncoming vehicle M1 has been recognized), and determination is made that the height of the side wall 204 on the road shoulder side is larger than the height of the mirror of the vehicle M ("Y" in Step S25). That is, the oncoming vehicle M1 has been recognized and the height of the side wall 204 is larger than the mirror height of the vehicle M.

Since the lateral distance is longer than the predetermined threshold or the relative speed is lower than the predetermined threshold in this case, a low avoidance priority level can be estimated for the oncoming vehicle M1 recognized by the drive assist apparatus 1 of the vehicle M. Since determination is made that the height of the side wall 204 is larger than the predetermined threshold, a high avoidance priority level can be estimated for the side wall 204.

Therefore, the traveling control unit 24 sets the new target lane keeping traveling path 205*bl* at the predetermined position closer to the road shoulder (away from the oncoming vehicle M1) compared with the target lane keeping traveling path 205 during the normal control in response to the driver's leftward steering in view of the oncoming vehicle M1. In this case, the new target lane keeping traveling path 205*bl* is set at the position away from the side wall 204 (closer to the oncoming vehicle M1) compared with the target lane keeping traveling path 205*al* during the control against the oncoming vehicle in consideration of the oncoming vehicle M1 (low avoidance priority level) and the side wall 204 (high avoidance priority level).

Since the new target lane keeping traveling path 205*bl* is set in consideration of both the oncoming vehicle M1 and the side wall 204, the pressure felt by the driver from the side wall 204 and the oncoming vehicle M1 can be reduced.

For example, when the vehicle M is traveling along the predicted rightward traveling path 207*ab* (FIG. 7), the process of Step S26 (for creating the lane keeping path against the side wall) is performed in the following situation. In FIG. 7, a traveling path represented by reference symbol 205*br* is a target lane keeping traveling path during control against the side wall when the predicted traveling path is on the right side (see reference symbol 207*ab* in FIG. 7) because the driver steers the vehicle M rightward while being aware of the side wall. The target lane keeping traveling path 205*br* is created at the predetermined position where the vehicle M keeps distance from the side wall 204 in the lateral direction compared with the target lane keeping traveling path 205 during the normal control.

Since the lateral distance is longer than the predetermined threshold or the relative speed is lower than the predetermined threshold in this situation, a low avoidance priority level can be estimated for the oncoming vehicle M1 recognized by the drive assist apparatus 1 of the vehicle M. Since determination is made that the height of the side wall 204 is larger than the predetermined threshold, a high avoidance priority level can be estimated for the side wall 204. By setting the new target lane keeping traveling path 205*br*, the pressure felt by the driver from the side wall 204 and the oncoming vehicle M1 can be reduced.

The traveling control unit 24 controls the vehicle M to travel along the new target lane keeping traveling path 205*bl* or 205*br*. When the side wall 204 is no longer recognized afterwards, traveling control is performed to return the vehicle M to the original target lane keeping traveling path 205 as represented by reference symbol 205*r* in FIG. 5 and FIG. 7. Then, the process returns to Step S11 of FIG. 3 to continue the lane keeping traveling control (see the connectors "3" in FIG. 4 and FIG. 3).

When determination is made that the vehicle M is unlikely to depart from the lane ("N" in Step S11 of FIG. 3) to perform the subsequent processing steps of FIG. 4, that is, the lane keeping control, the oncoming vehicle M1 has been recognized, and the height of the side wall 204 is larger than the mirror height of the vehicle M, the new target lane keeping traveling path 205*bl* or 205*br* for shifting the vehicle M closer to either one of the road shoulder and the right side compared with the normal target lane keeping traveling path 205 is created while reflecting the driver's intention.

The new target lane keeping traveling path 205*bl* is created away from the oncoming vehicle M1 in the lateral direction compared with the target lane keeping traveling path 205 during the normal control and away from the side wall 204 compared with the target lane keeping traveling path 205*al* during the control against the oncoming vehicle. The new target lane keeping traveling path 205*br* is created away from the side wall 204 in the lateral direction compared with the target lane keeping traveling path 205 during the normal control.

In other words, when determination is made that the vehicle M is unlikely to depart from the lane to perform the lane keeping control though the driver steers the vehicle M leftward while being aware of the oncoming vehicle, the oncoming vehicle M1 has been recognized, and the height of the side wall 204 is large, the new target lane keeping traveling path 205*bl* is created at the position where the vehicle M is shifted closer to the road shoulder and keeps distance from the oncoming vehicle M1 compared with the normal target lane keeping traveling path 205 and where the vehicle M is shifted away from the side wall 204 compared with the target lane keeping traveling path 205*al*. The new target lane keeping traveling path 205*bl* is the target lane keeping traveling path during the control against the side wall.

When determination is made that the vehicle M is unlikely to depart from the lane to perform the lane keeping control though the driver steers the vehicle M rightward while being aware of the side wall 204, the oncoming vehicle M1 has been recognized, and the height of the side wall 204 is large, the new target lane keeping traveling path 205*br* is created at the position where the vehicle M is shifted closer to the right side and keeps distance from the side wall 204 compared with the normal target lane keeping traveling path 205. The new target lane keeping traveling path 205*br* is the target lane keeping traveling path during the control against the side wall.

In this case, the vehicle M appropriately performs the lane keeping control along the new target lane keeping traveling path 205*bl* or 205*br* while exhibiting behavior as intended by the driver's steering (traveling leftward or rightward). Thus, the driver does not feel discomfort.

When determination is made in the process of Step S23 that the height of the side wall 204 on the road shoulder side of the vehicle M is larger than the height of the mirror of the vehicle M (see the connector "B" in FIG. 4), or when determination is made in the process of Step S25 that the height of the side wall 204 on the road shoulder side of the vehicle M is smaller than the height of the mirror of the vehicle M, the process proceeds to Step S27. In Step S27, the traveling control unit 24 executes normal lane keeping control. When the oncoming vehicle and the side wall 204 are no longer recognized afterwards, traveling control is performed to return the vehicle M to the original target lane keeping traveling path 205 as represented by reference symbol 205*r* in FIG. 5. Then, the process returns to Step S11 of FIG. 3 to continue the lane keeping traveling control (see the connectors "3" in FIG. 4 and FIG. 3).

For example, the normal lane keeping traveling control is traveling control along the target lane keeping traveling path 205 in FIG. 5. In this situation, determination is made that the vehicle M is unlikely to depart from the lane ("N" in Step S11 of FIG. 3). At this time, the vehicle M may be traveling in an area slightly departing from the target lane keeping traveling path 205 toward the road shoulder. Therefore, the traveling control is performed to return the vehicle M to the target lane keeping traveling path 205 by steering the vehicle M for correction of the departure from the target lane keeping traveling path 205. In this manner, the lane keeping traveling control is performed continuously.

According to the embodiment described above, when the vehicle M including the vehicle drive assist apparatus 1 that can execute at least the lane keeping traveling control for causing the vehicle M to travel along the lane 201 and the lane departure prevention control for suppressing departure of the vehicle M from the lane 201 is traveling along the ordinary road having no three-dimensional structure such as a median strip while executing the lane keeping traveling control, and it is detected that the driver steers the vehicle M rightward or leftward while being aware of the avoidance target such as the oncoming vehicle or the side wall 204 on the road shoulder side, determination is made about the steering direction and whether the vehicle M is likely to depart from the lane based on the information such as the steering torque and the steering angle obtained based on the outputs from the steering torque sensor 12 and the steering angle sensor 15.

When the lane departure prevention control is performed through the detection of steering in the leftward direction (toward the road shoulder) and the determination that the vehicle M is likely to depart from the lane, the target lane departure prevention traveling path is set as follows.

When the oncoming vehicle (M1 or M2) and the side wall 204 on the road shoulder side are recognized and the avoidance priority level is higher in the oncoming vehicle (M2) than in the side wall 204 (Step S15 of FIG. 3), the target lane departure prevention traveling path 207*cl* against the oncoming vehicle M2 (see FIG. 6) is set. The target lane departure prevention traveling path 207*cl* is set at the position where the vehicle M keeps distance from the oncoming vehicle M2 in the lateral direction compared with the target lane departure prevention traveling path 207*bl* during the normal control.

When the avoidance priority level is higher in the side wall 204 on the road shoulder side than in the oncoming vehicle (M1) (Step S17 of FIG. 3), the target lane departure prevention traveling path 207*dl* against the side wall 204 (see FIG. 6) is set. The target lane departure prevention traveling path 207*dl* is set at the position where the vehicle M keeps distance from the side wall 204 in the lateral direction compared with the target lane departure prevention traveling path 207*bl* during the normal control.

When the lane keeping control is performed through the detection of steering in the leftward direction (toward the road shoulder) and the determination that the vehicle M is unlikely to depart from the lane, the target lane keeping traveling path is set as follows.

When the oncoming vehicle (M1 or M2) and the side wall 204 on the road shoulder side are recognized and the avoidance priority level is higher in the oncoming vehicle (M2) than in the side wall 204 (Step S24 of FIG. 4), the target lane keeping traveling path 205*al* against the oncoming vehicle M2 (see FIG. 5) is set. The target lane keeping traveling path 205*al* is set at the position where the vehicle M keeps distance from the oncoming vehicle M2 in the lateral direction compared with the target lane keeping traveling path 205 during the normal control.

When the avoidance priority level is higher in the side wall 204 on the road shoulder side than in the oncoming vehicle (M1) (Step S26 of FIG. 4), the target lane keeping traveling path 205*bl* against the side wall 204 (see FIG. 5) is set.

The target lane keeping traveling path 205*bl* is set at the position where the vehicle M keeps distance from the oncoming vehicle M2 in the lateral direction compared with the target lane keeping traveling path 205 during the normal control and keeps distance from the side wall 204 in the lateral direction compared with the target lane keeping traveling path 205*al* during the control against the oncoming vehicle.

When the lane departure prevention control is performed through the detection of steering in the rightward direction (toward the road center) and the determination that the vehicle M is likely to depart from the lane, the target lane departure prevention traveling path is set as follows.

When the oncoming vehicle (M1 or M2) and the side wall 204 on the road shoulder side are recognized and the avoidance priority level is higher in the oncoming vehicle (M2) than in the side wall 204 (Step S15 of FIG. 3), the target lane departure prevention traveling path 207*cr* against the oncoming vehicle M2 (see FIG. 8) is set. The target lane departure prevention traveling path 207*cr* is set at the position where the vehicle M keeps distance from the oncoming vehicle M2 in the lateral direction compared with the target lane departure prevention traveling path 207*br* during the normal control.

When the avoidance priority level is higher in the side wall 204 on the road shoulder side than in the oncoming vehicle (M1) (Step S17 of FIG. 3), the target lane departure prevention traveling path 207*dr* against the side wall 204 (see FIG. 8) is set. The target lane departure prevention traveling path 207*dr* is set at the position where the vehicle M keeps distance from the side wall 204 in the lateral direction compared with the target lane departure prevention traveling path 207*br* during the normal control.

When the lane keeping control is performed through the detection of steering in the rightward direction (toward the road center) and the determination that the vehicle M is unlikely to depart from the lane, the target lane keeping traveling path is set as follows.

When the oncoming vehicle (M1 or M2) and the side wall 204 on the road shoulder side are recognized and the avoidance priority level is higher in the oncoming vehicle (M2) than in the side wall 204 (Step S24 of FIG. 4), the target lane keeping traveling path 205*ar* against the oncoming vehicle M2 (see FIG. 7) is set.

The target lane keeping traveling path 205*ar* is set at the position where the vehicle M keeps distance from the oncoming vehicle M2 in the lateral direction compared with the target lane keeping traveling path 205 during the normal control and keeps distance from the side wall 204 in the lateral direction compared with the target lane keeping traveling path 205 during the normal control.

When the avoidance priority level is higher in the side wall 204 on the road shoulder side than in the oncoming vehicle (M1) (Step S26 of FIG. 4), the target lane keeping traveling path 205*br* against the side wall 204 (see FIG. 7) is set.

The target lane keeping traveling path 205*br* is set at the position where the vehicle M keeps distance from the side wall 204 in the lateral direction compared with the target lane keeping traveling path 205 during the normal control.

As described above, the drive assist apparatus 1 of this embodiment detects the relative relationship between the vehicle and the avoidance target based on various types of information such as the surrounding situation information of the vehicle M that is acquired by the surrounding situation information acquisition device and the steering direction and the steering angle of the vehicle M that are acquired by the steering torque sensor and the steering angle sensor, estimates the avoidance priority level for the avoidance target including the oncoming vehicle recognized around the vehicle M, and sets either one of the target lane keeping traveling path and the target lane departure prevention traveling path based on the avoidance priority level.

With this configuration, when the driver of the vehicle M traveling along the ordinary road steers the vehicle M rightward or leftward while being aware of, for example, either one of the oncoming vehicle and the side wall on the road shoulder side, the drive assist apparatus 1 of this embodiment can suppress excessive execution of either one of the lane keeping control and the lane departure prevention control, and execute either one of the lane keeping control and the lane departure prevention control while reflecting the driver's steering intention. Thus, smooth traveling control can be achieved by appropriate drive assist control without causing driver's discomfort.

The embodiment of the disclosure is not limited to the embodiment described above, and various modifications and applications may be made without departing from the gist of the disclosure. The embodiment includes various aspects of the disclosure that may be extracted by any appropriate combination of a plurality of disclosed constituent elements. For example, some of the constituent elements in the embodiment may be omitted as long as the problems described above can be solved and the effects described above can be attained. The constituent elements of different embodiments may be combined as appropriate. The embodiment of the disclosure is limited to the appended claims but not limited to specific modes of implementation.

According to the embodiment of the disclosure, it is possible to provide the vehicle drive assist apparatus that can perform more appropriate drive assist control without causing driver's discomfort.

The traveling control unit 24 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the traveling control unit 24. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle drive assist apparatus to be applied to a vehicle, the vehicle drive assist apparatus being configured to execute at least lane keeping traveling control for causing the vehicle to travel along a traveling lane and lane departure prevention control for suppressing departure of the vehicle from the traveling lane, the vehicle drive assist apparatus comprising:
   a surrounding situation information acquisition device configured to acquire surrounding situation information of the vehicle, the surrounding situation information acquisition device comprising a camera or a radar sensor;
   a steering angle sensor configured to detect a steering angle and a steering direction of the vehicle; and
   a traveling controller configured to centrally control the vehicle, the traveling controller comprising a steering assist controller configured to execute traveling control involving steering assist control based on information output from the surrounding situation information acquisition device and information output from the steering angle sensor,
   wherein the steering assist controller is configured to
      recognize, based on the information output from the surrounding situation information acquisition device, an oncoming vehicle in an oncoming lane adjacent to the traveling lane of the vehicle and an avoidance target on a road shoulder side of the traveling lane of the vehicle,
      estimate an avoidance priority level of the oncoming vehicle and an avoidance priority level of the avoidance target, and
      set a new target lane keeping traveling path of the vehicle based on the avoidance priority level of the oncoming vehicle and the avoidance priority level of the avoidance target.

2. The vehicle drive assist apparatus according to claim 1, wherein the steering assist controller is further configured to
   determine whether the vehicle is likely to depart from the traveling lane based on the information output from the surrounding situation information acquisition device and the information output from the steering angle sensor, and
   upon determining that the vehicle is likely to depart from the traveling lane, set a new target lane departure prevention traveling path of the vehicle based on the avoidance priority level of the oncoming vehicle and the avoidance priority level of the avoidance target.

3. The vehicle drive assist apparatus according to claim 1,
   wherein the avoidance priority level of the oncoming vehicle is estimated based on a lateral distance between the vehicle and the oncoming vehicle and a relative speed between the vehicle and the oncoming vehicle, and
   wherein the avoidance priority level of the avoidance target is estimated based on a height of the avoidance target relative to a height of an outer rearview mirror of the vehicle.

4. The vehicle drive assist apparatus according to claim 2,
   wherein the avoidance priority level of the oncoming vehicle is estimated based on a lateral distance between the vehicle and the oncoming vehicle and a relative speed between the vehicle and the oncoming vehicle, and
   wherein the avoidance priority level of the avoidance target is estimated based on a height of the avoidance target relative to a height of an outer rearview mirror of the vehicle.

5. The vehicle drive assist apparatus according to claim 3, wherein either one of the new target lane keeping traveling path and a new target lane departure prevention traveling path is set at a position where the vehicle keeps distance in a lateral direction from either one of the oncoming vehicle and the avoidance target, the avoidance priority level of the either one being higher.

6. The vehicle drive assist apparatus according to claim 4, wherein either one of the new target lane keeping traveling path and the new target lane departure prevention traveling path is set at a position where the vehicle keeps distance in a lateral direction from either one of the oncoming vehicle and the avoidance target, the avoidance priority level of the either one being higher.

7. A vehicle drive assist apparatus to be applied to a vehicle, the vehicle drive assist apparatus being configured to execute at least lane keeping traveling control for causing the vehicle to travel along a traveling lane and lane departure prevention control for suppressing departure of the vehicle from the traveling lane, the vehicle drive assist apparatus comprising:
   a surrounding situation information acquisition device configured to acquire surrounding situation information of the vehicle, the surrounding situation information acquisition device comprising a camera or a radar sensor;
   a steering angle sensor configured to detect a steering angle and a steering direction of the vehicle; and
   circuitry configured to
      centrally control the vehicle,
      execute traveling control involving steering assist control based on information output from the surrounding situation information acquisition device and information output from the steering angle sensor,
      recognize, based on the information output from the surrounding situation information acquisition device, an oncoming vehicle in an oncoming lane adjacent to the traveling lane of the vehicle and an avoidance target on a road shoulder side of the traveling lane of the vehicle, estimate an avoidance priority level of the oncoming vehicle and an avoidance priority level of the avoidance target, and set a new target lane keeping traveling path of the vehicle based on the avoidance priority level of the oncoming vehicle and the avoidance priority level of the avoidance target.

\* \* \* \* \*